（12） United States Patent
Shinohara et al.

(10) Patent No.: US 6,343,792 B1
(45) Date of Patent: Feb. 5, 2002

(54) SHAFT SEAL AND TURBINE USING THE SAME

(75) Inventors: Tanehiro Shinohara; Kouichi Akagi; Masanori Yuri; Masahiko Toyoda; Yutaka Ozawa; Akihiro Kawaguchi; Setunori Sakakibara; Zenichi Yoshida; Nobuhiro Kunitake; Takahiro Ohta, all of Takasago; Hidehiko Nakane, Kobe; Eisaku Ito, Takasago; Yutaka Kawata, Takasago; Koji Takeshita, Takasago, all of (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/525,317

(22) Filed: Mar. 13, 2000

(30) Foreign Application Priority Data

| Jul. 13, 1998 | (JP) | 10-197790 |
| Jul. 27, 1998 | (JP) | 10-211631 |
| Jul. 27, 1998 | (JP) | 10-211632 |
| Jul. 27, 1998 | (JP) | 10-211633 |
| Jul. 27, 1998 | (JP) | 10-211634 |
| Jul. 27, 1998 | (JP) | 10-211635 |
| Jul. 27, 1998 | (JP) | 10-211636 |
| Jul. 27, 1998 | (JP) | 10-211637 |
| Nov. 12, 1998 | (JP) | 10-322661 |

(51) Int. Cl.$^7$ ............................................. F16J 15/48
(52) U.S. Cl. ........................................ 277/355; 277/345
(58) Field of Search .................. 277/355, 559, 277/560, 562, 565

(56) References Cited

U.S. PATENT DOCUMENTS

| 4,526,509 A | * | 7/1985 | Gay | 277/355 |
| 5,056,799 A | * | 10/1991 | Takenaka et al. | 277/559 |
| 5,135,237 A | * | 8/1992 | Flower | 277/355 |
| 5,324,051 A | * | 6/1994 | Schivley | 277/355 |
| 5,509,664 A | * | 4/1996 | Borkiewicz | 277/565 |

FOREIGN PATENT DOCUMENTS

| JP | 6-71969 | 10/1994 |
| JP | 9-119526 | 5/1997 |
| JP | 10196801 A | 7/1998 |

* cited by examiner

Primary Examiner—Anthony Knight
Assistant Examiner—Enoch Peavey
(74) Attorney, Agent, or Firm—Oblon, Spivak, McClelland, Maier & Neustadt, P.C.

(57) ABSTRACT

A shaft seal having a high abrasion resistance is disclosed, by which the leakage of the gas from the high-pressure side to the low-pressure side can be reduced. In the shaft seal, flexible leaves are multi-layered to form a ring shape. The shaft seal is mainly arranged around the rotation shaft of a gas turbine or the like. The relevant turbine comprises a casing, a compressor, a rotation shaft, moving blades attached to the rotation shaft, and stationary blades attached to the casing in a manner such that the stationary blades face the moving blades, wherein the shaft seals are provided between a plurality of stationary blades and the rotation shaft wherein the leaves of each shaft seal contact the rotation shaft. Under the rated operating conditions, the top ends of the leaves slightly separate from the surface of the rotation shaft due to the dynamic pressure generated by the rotation of the rotation shaft. When the turbine is not operated, the top ends of the leaves contact the rotation shaft again due to the elastic restoring force of the leaves.

40 Claims, 35 Drawing Sheets

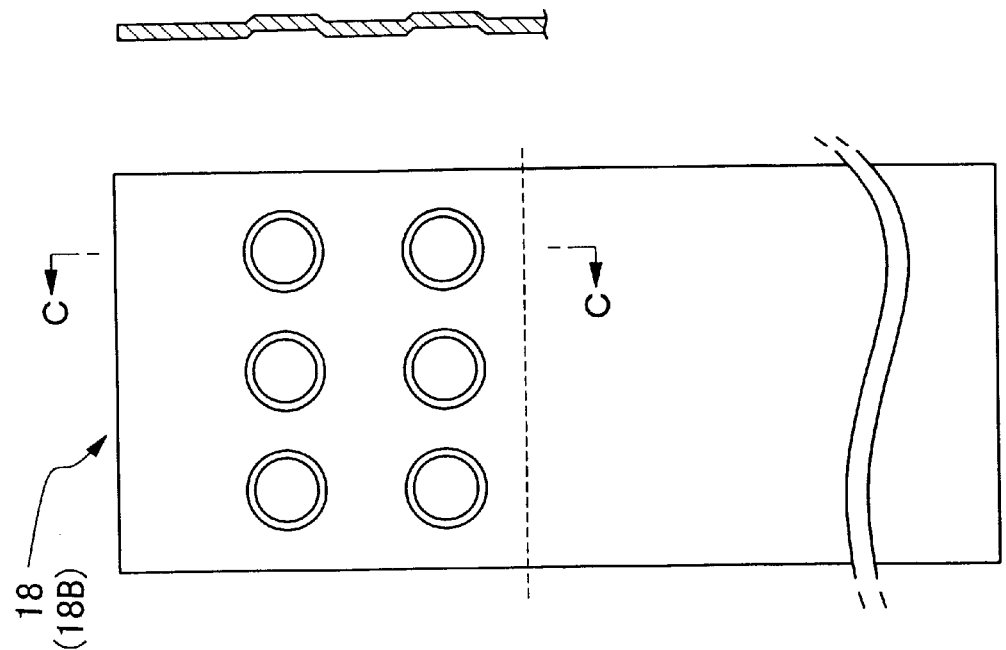
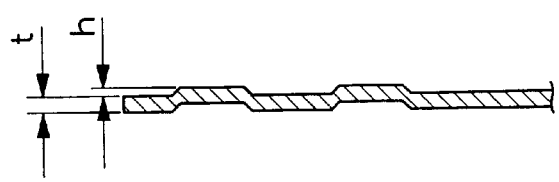
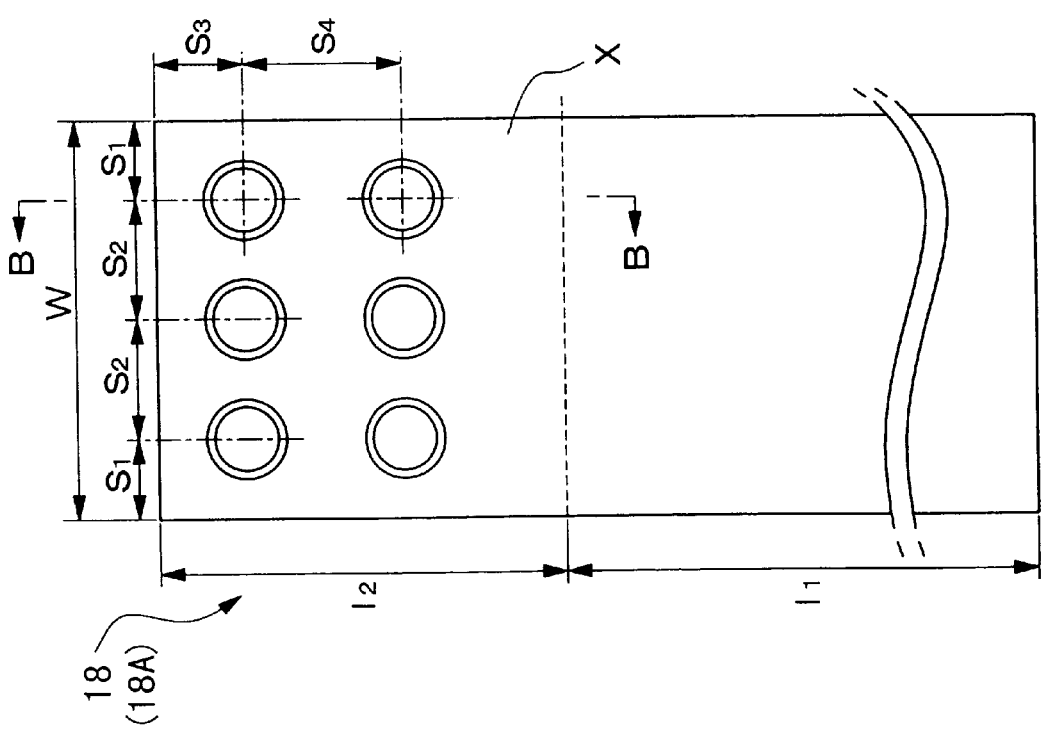

HIGH-PRESSURE AREA

LOW-PRESSURE AREA

ROTATION DIRECTION

SHAFT SEAL AND TURBINE USING THE SAME

TECHNICAL FIELD

The present invention relates to a shaft sealing structure applicable to a rotation shaft of a large fluid machine such as various kinds of turbines, compressors, water turbines or wheels, refrigerating machines, and pumps, and in particular, to a gas or steam turbine to which a shaft seal is applied.

BACKGROUND ART

A typical gas turbine generates power by introducing a high-temperature and high-pressure gas into a turbine so as to expand the gas, and converting the thermal energy of the gas into mechanical rotational energy. Such a gas turbine has a seal mechanism (i.e., shaft seal), arranged between stationary blades and -the rotation shaft, for reducing the leakage of the combustion gas, that is, the amount of gas which leaks from the high-pressure side to the low-pressure side. Conventionally, a non-contact labyrinth seal is widely known and used as such a sealing structure. When the labyrinth seal is employed, it is necessary to have a relatively large gap at the end of each fin so as to prevent the fin from contacting the face which faces the fin even if the shaft is vibrated during a transitional period of the rotation, or if the relevant portion is thermally and transitionally deformed. Therefore, the leakage is relatively large in the labyrinth seal. As a substitute for the labyrinth seal, a brush seal has been developed so as to reduce the leakage.

FIGS. 37A and 37B show a general structure of the brush seal. In the figures, reference numeral 1 indicates a rotation shaft, reference numeral 2 indicates a casing, reference numeral 3 indicates a low-pressure side end plate, reference numeral 4 indicates a high-pressure side end plate, reference numeral 5 indicates a brazed portion, and reference numeral 6 indicates a wire bundle. The wire bundle 6, having a width of 1 to 3 mm, consists of filaments closely arranged with no gap between each other, and each filament has a diameter of 50 to 100 $\mu$m and suitable rigidity by which eccentricity due to vibration or thermal deformation of the rotation shaft 1 or the like can be absorbed. In addition, the wire bundle 6 is inclined with respect to the rotation direction so as to make an acute angle between the wire bundle and the outer-peripheral surface of the rotation shaft 1. The end of the wire bundle 6 contacts the outer-peripheral surface of the rotation shaft 1 via a specific pre-load, thereby reducing the leakage in the axial direction of the shaft.

The wire bundle 6 slides on the rotation shaft 1 in contact with the shaft. This sliding motion may heat the wire bundle 6 and make the bundle red, according to the environmental conditions or the rotation speed. Therefore, the wire bundle 6 may be made of a heat-resisting material such as inconel or hastelloy according to the usage condition. In addition, the sliding surface, that is, the outer-peripheral surface of the rotation shaft 1, is also subject to abrasion, as in the wire bundle 6; thus, the relevant surface of the rotation shaft 1 is coated with an abrasion resistant material. Furthermore, the wire bundle 6 has smaller rigidity in the axial direction of the rotation shaft 1; thus, the inner diameter of the low-pressure side end plate is made approximately the same as the diameter of the circumference of the rotation shaft 1, thereby preventing breakage of the wire bundle 6.

The above brush seal has the following problems.

In the brush seal, leakage through gaps between the wires of the bundle 6 or gaps near the end of the bundle, or around the sliding portion (i.e., face) contacting the outer-peripheral surface of the rotation shaft 1 is a typical problem. If the differential pressure of the seal exceeds a permissible value which is determined based on the diameter of each wire of bundle 6, the structure or arrangement of the low-pressure side end plate, and the like, the wire bundle 6 is deformed towards the low-pressure side, so that the area between the wire bundle 6 and the rotation shaft 1 is not sealed and thus the sealing effect cannot be obtained.

The rigidity of the wire bundle 6 as a constituent of the brush seal is determined according to the following capability of the wire bundle 6 with respect to the vibration of the rotation shaft 1, or to a suitable pre-load between the wire bundle 6 and the rotation shaft 1. The rigidity can be increased by using a thicker wire, but this has limits. That is, the maximum differential pressure for sealing in the axial direction of the rotation shaft 1, dependent on the rigidity of wire bundle 6, is approximately 5 kgf/cm$^2$, and a much larger differential pressure cannot be maintained using a seal. Generally, the diameter of each wire is approximately 50 to 100 $\mu$m, that is, very thin. Therefore, when such thin wires contact and slide on the peripheral surface of the rotation shaft 1, the wire bundle 6 may be broken and come off, and this is a serious problem when the relevant gas turbine is operated for a long time.

The leakage around the end portion of the wire bundle 6 is much smaller than that of the labyrinth seal or the like, because the wire bundle 6 contacts the peripheral surface of the rotation shaft 1 when it slides on the surface. However, it is difficult to reliably maintain a smaller leakage between the wires of the wire bundle 6.

In addition, the peripheral surface of the rotation shaft 1 must be coated with an abrasion resistant material because the wire bundle 6 and the peripheral surface contact each other during the sliding motion. However, a technique for making an anti-abrasion coating C which suits a rotation shaft having a large diameter and lasts for a long time has not yet been established, and the wire bundle 6 and rotation shaft 1 suffer considerable abrasion. Therefore, the brush seal has a short lifetime and must be frequently replaced.

DISCLOSURE OF INVENTION

It is an object of the present invention to provide a shaft seal which has a high sealing capability and by which leakage can be reduced. Another object of the present invention is to provide a turbine using the above shaft seal, in particular, a gas turbine which has a high abrasion resistance in the seal structure, and can reduce the gas leakage from the high-pressure side to the low-pressure side.

Therefore, the present invention provides a shaft seal having flexible leafs (i.e.,) which are multi-layered to form a ring shape. Typically, one side of the multi-layered leaves is fixed to a fixing member having a cylindrical shape, and the shaft seal is arranged around a predetermined shaft (mainly, a rotation shaft).

According to the leaves employed as a sealing component, the area fixed to the casing is larger in comparison with the conventional wires; thus, the leaves are firmly fixed to the casing, thereby preventing the leaves from falling off from the casing, as observed in the conventional brush seal.

In addition, the top ends of the leaves have flexibility in the circumferential direction of the rotation shaft, and have high rigidity in the axial direction of the rotation shaft. Therefore, the leaves are not easily deformed in the direction of the differential pressure; and thus the permissible value of the differential pressure to be sealed can be increased.

When the vibration of the rotation shaft is large near the resonance point or the like, the leaves are deformed and the contact state with the rotation shaft is eased. In addition, under the rated conditions, the ends of the leaves separate from the surface of the shaft due to the dynamic pressure generated by the rotation of the rotation shaft. Therefore, it is possible to prevent excessive heating and abrasion caused by the contact of the leaves and the rotation shaft. Furthermore, according to the prevention of the heating due to the contact between the leaves and the rotation shaft, vibration generated depending on the thermal balance in the rotation shaft can also be prevented.

In the above structure, each leaf may be inclined with respect to the radial direction of the shaft. In particular, if each leaf is inclined with respect to the radial direction of the shaft in a manner such that each leaf leans towards the opposite direction of the rotation direction of the rotation shaft, then the top ends of the leaves are separated from the surface of the rotation shaft due to the dynamic pressure generated by the rotation of the rotation shaft. Therefore, contact between the rotation shaft and the leaves is prevented.

In this case, if each leaf has a flat plate shape, and is inclined with respect to the peripheral surface of the rotation shaft by 30 to 45 degrees, then the flexural rigidity of the plate is small and the top ends of the leaves are separated from the surface of the rotation shaft due to the dynamic pressure generated by the rotation of the shaft. Therefore, the resistance in the rotation direction also becomes smaller, thereby reducing the sealing loss of the shaft seal.

The gap between adjacent leaves can be substantially the same at both the inner-peripheral side and the outer-peripheral side of the ring-shaped shaft seal. In this case, it is possible to much more closely arrange the leaves, and to make the gap between the rotation shaft and the top ends of the leaves much smaller in comparison with the conventional non-contact labyrinth seal. Accordingly, it is possible to remarkably reduce the leakage of the gas, and as a result, the performance of the (gas) turbine can be improved.

Here, if the seal diameter is sufficiently large (for example, approximately 1000 mm), then the gaps between the leaves can be significantly the same. However, if the seal diameter is relatively small, uniformly-curved leaves, which have a circular-arc shape (that is, the curvature gradually changes in the radial direction), are preferably used so as to make the widths of the gaps (between the leaves) substantially the same. Therefore, also in this case, it is possible to much more closely arrange the leaves, and the leakage through the gaps between the leaves can be reduced, thereby improving the efficiency of the turbine employing the present shaft seal.

Also in the shaft seal of the present invention, buoyancy providing means may be provided at the shaft-side top end of each leaf. If the shaft seal employing this structure is applied to the rotation shaft of a turbine, then during the rated operation, the top ends of the leaves are efficiently separated from the rotation shaft due to the dynamic pressure, thereby effectively preventing the contact between the rotation shaft and the leaves.

As a preferable example, the buoyancy providing means is a slope wherein the distance between the top point of the leaf and the peripheral surface of the rotation shaft (around which the shaft seal is arranged) gradually decreases along the rotation direction of the shaft. In this case, a dynamic pressure is caused by the wedge effect of the slope, so that the top ends of the leaves are separated from the rotation shaft.

Such a slope can be formed by the following processing method comprising the steps of:

(1) fixing the outer-peripheral base ends of the leaves in a manner such that each leaf is inclined with respect to the radial direction of the shaft and that each leaf leans towards the opposite direction of the rotation direction of the rotation shaft;

(2) pushing the inner-peripheral free ends of each leaf in a manner such that the acute angle between the leaf and the peripheral surface of the rotation shaft is decreased; and processing the top end of the leaf under the above pushed state, so as to make the top end substantially in parallel with the rotation shaft; and (3) releasing the pushed state after the processing process.

As another example, the buoyancy providing means may be provided by forming a step in the end face of the top end of the leaf and in the axial direction of the shaft. In this case, buoyancy is generated due to the differential pressure at the step, so that the top ends of the leaves are separated from the rotation shaft.

As a further example, the buoyancy providing means may be provided by forming a step in the end face of the top end of the leaf and in the circumferential direction of the shaft. In this case, the top ends of the leaves are separated from the rotation shaft by using the dynamic pressure caused by the rotation.

It is possible that the direction of the width of each leaf is not parallel with the axial direction of the shaft. In this case, the length of the passage between adjacent leaves is longer than the length of the axial direction, thereby increasing the resistance of the passage. Accordingly, the leakage between the leaves can be further reduced.

Typically, when the leaves receive pressure from the high-pressure side, the top ends of the leaves are separated from the shaft. Therefore, the top ends of the leaves can be separated from the rotation shaft, and the contact between the rotation shaft and the leaves can be prevented. Accordingly, it is possible to prevent excessive heating and abrasion caused by the contact of the leaves and the rotation shaft.

Also in the shaft seal of the present invention, circumferential end plates may be respectively arranged at both sides of the leaves, and a gap may be provided between the leaves and each end plate wherein the width of the gap is as narrow as possible for the leaves to move. Accordingly, the pressure applied to the leaves from the high-pressure side and the suction force applied to the leaves from the low-pressure side are reduced, so that deformation of the leaves towards the direction of the differential pressure can be prevented and the resistance of the passage can be increased around the leaves.

Here, each leaf may be inclined with respect to the radial direction of a predetermined shaft; and the gap between the shaft and the top end of one of the end plates may be the same as the gap between the shaft and the top end of the other end plate. Accordingly, the above gap can be as small as possible for the rotation shaft to rotate, and the length of each end plate in the radial direction of the rotation shaft can be approximately the same as the length of the leaves in the radial direction, thereby much further increasing the resistance of the passage around the leaves.

In addition, the gap between one of the end plates and the leaves can be the same as the gap between the other end plate and the leaves. In this case, deformation of the leaves along the direction of the differential pressure can be much more reliably prevented.

In a variation, the outer-peripheral base end of the ring-shape leaves are attached to a circular body consisting of a plurality of separate circular-arc portions, and a division face between the separate circular-arc portions engaging each other has a step in the circumferential direction. According to this structure, the high-pressure combustion gas which reaches the junction between the separate portions cannot pass through the junction because the division face having a step blocks the gas. Therefore, it is possible to prevent the leakage of the combustion gas through the junction. In addition, the above engagement in the division face can reinforce the junction.

In another variation, the leaves are grouped into a plurality of unit segments, each unit segment including a predetermined number of leaves, and space is provided between adjacent unit segments. In this case, when the top ends of the leaves 18 separate from a contact surface, the leaves belonging to a unit segment are not much affected by the leaves belonging to adjacent unit segments because there is a space between the unit segments. Therefore, the leaves can much more easily separate from a contact surface, typically, from a rotation shaft.

It is also possible that each leaf is inclined with respect to the radial direction of the rotation shaft; and a fluid delivery unit for delivering fluid around the peripheral surface of the rotation shaft to each leaf by using the centrifugal force of the shaft is provided in an area of the rotation shaft, where leaves slides. According to this structure, the fluid around the rotation shaft is delivered toward each leaf by the centrifugal force of the shaft. Therefore, according to the pressure of the fluid, the top ends of the leaves can easily separate from the shaft, and it is possible to much more reliably prevent excessive heating and abrasion due to the contact between the rotation shaft and the leaves.

In another variation, each leaf has a gap making portion which protrudes from the surface of the leaf. If the protrusion height is the same as the width of a desired gap between the leaves, micro-gaps having a specific width can be reliably provided at both the inner-peripheral side and the outer-peripheral side, only by making the leaves contact each other via the gap making portion.

The gap making portion may be a protruding portion produced by deforming a part of the leaf. In this case, it is unnecessary to attach a separate component to the leaf; thus, the number of necessary components is not increased. Such a protruding portion can be produced by, for example, the precise pressing method.

The gap making portion may be a coated layer formed on a part of the leaf. The coated layer can be produced by using, for example, the hot dipping method. Also in this case, the gap making portion can be provided on the leaf without increasing the number of necessary components. In particular, if the coated layer is a plated layer, the thickness thereof can be determined to micrometer order, thereby precisely providing the gap (between the leaves) over the relevant circumference of the rotation shaft.

When the number of necessary components is not increased as described above, the productivity can be improved and no strict production control is necessary, thereby reducing the manufacturing cost.

In a further variation, the gap making portion is a step produced by etching a part of the leaf. That is, when a part of each leaf is etched, a step functioning as the gap making portion is formed between the etched and non-etched areas. Accordingly, the gap between the leaves can be precisely provided.

That is, only by making the leaves contact each other via the gap making portion, micro-gaps having a specific width can be reliably provided at both the inner-peripheral side and the outer-peripheral side; therefore, a turbine comprising a shaft seal structure having a high sealing capability can be easily realized.

The shaft seal may have a plurality of escape passages in the circumferential direction, wherein the escape passages are provided by making gaps between the relevant leaves have a larger width in comparison with the other gaps between the leaves.

Preferably, the escape passage is provided in some suitable leaves of the shaft seal in the circumferential direction, and is produced by removing a freely-bending portion (at the top-end side) of the target leaves (only one end of which is fixed and supported) so that in the circumferential direction, the widths of the relevant gaps (i.e., the escape passages) generated by this removing process are larger than the other gaps.

According to the above structure, a part of the pressure of the high-pressure side of the shaft seal is released to the low-pressure side through the escape passages provided along the circumferential direction of the shaft seal. Therefore, an increase of the differential pressure between the high-pressure and low-pressure sides is prevented and thus damage to the leaves due to the increase of the differential pressure can be prevented. Accordingly, even when the leaves having a smaller rigidity are used so as to improve the fluid sealing capability, no damage occurs because the above pressure-releasing function using the escape passages is effective.

It is also possible that the leaves are grouped into a plurality of unit segments, each unit segment including a predetermined number of leaves, and the leaves of each unit segment are attached to a main leaf whose thickness is larger than that of each leaf.

In a preferable example, a unit segment includes 50 to 100 leaves, and the main leaf comprises a leaf portion which is positioned between the segments and whose (outer-peripheral side) base end is brazed and fixed to the base-end side of the leaves, and a skirt portion integrally connected with the inner-peripheral side of the leaf portion, wherein a small gap is provided between the skirt portion and the outer-peripheral surface of the rotation shaft.

According to this structure, a plurality of leaves is supported as a single block by using the main leaf, so that the rigidity of the leaves can be improved. Therefore, even when the differential pressure between the high-pressure and low-pressure sides is large, the sealing of fluid can be realized using the leaves without damage. In addition, if a torsional load acts on the leaves due to the differential pressure, damage to the leaves can be prevented because of the above-explained increase of the rigidity (according to the blocked structure), thereby improving the durability.

In addition, under the rated operational conditions, the inner-peripheral side of the skirt portion of the main leaf and the outer-peripheral surface of the rotation shaft can be in a non-contact state by using the differential pressure and dynamic pressure.

If necessary, a plurality of the above-explained shaft seals are arranged around a predetermined shaft, via a spacing between each other along the axial direction of the shaft.

In this case, the pressure of the fluid in the high-pressure chamber is gradually reduced through a plurality of stages (of each shaft seal) along the axial direction of a rotation shaft or the like, and finally reaches the pressure of the low-pressure chamber when the fluid flows out from the last-stage shaft seal. Accordingly, in comparison with a structure employing a single shaft seal, the leakage of fluid can be remarkably reduced. The present invention can be effectively and easily applied to sealing of a large differential pressure around a shaft having a large diameter.

It is possible that among the shaft seals, the width in the axial direction of the shaft seal closest to the high-pressure side is largest, while the width in the axial direction of the shaft seal closest to the low-pressure side is smallest. Preferably, the pressure gradually decreases from the high-pressure side to the low-pressure side.

Here, the width L in the axial direction of each shaft seal can be defined by the following formula:

$$L = k(P_1^2 - P_2^2)/G \quad (1)$$

where $P_1$ indicates the pressure at the high-pressure side, $P_2$ indicates the pressure at the low-pressure side, G indicates the weight flow of leakage of fluid, and k is a specific coefficient.

The weight flow of leakage G at each stage can be defied as follows:

$$G (p_1^2 - P_2^2)/L \quad (2)$$

That is, leakage G at each stage is in inverse proportion to width L in the axial direction, and in proportion to the difference of the pressures squared. Accordingly, leakage G is decreased as width L in the axial direction becomes larger.

Therefore, it is possible to determine the number of stages of the shaft seals and each width L in the axial direction by using the above formula (1) so as to realize the condition that width $L_1$ (in the axial direction) at the high-pressure chamber (having pressure $P_0$) side is largest, and the above L gradually decreases according to the decrease of the pressure towards the low-pressure chamber (having pressure $P_a$) side, and the pressure at the exit of the last stage is $P_a$ (generally, the atmospheric pressure) of the low-pressure chamber. Under this condition, a minimum leakage of fluid from the high-pressure chamber to the low-pressure chamber can be realized. Therefore, the number of stages of the shaft seals and each width (in the axial direction) necessary for realizing the minimum leakage of the fluid can be easily determined.

The above-explained shaft seal according to the present invention is preferably applied to a gas turbine in which a high-temperature and high-pressure gas is introduced into a casing, and the high-temperature and high-pressure gas is blasted against moving blades fixed to a rotation shaft which is rotatably supported in the casing, so that the thermal energy of the gas is converted into the mechanical rotational energy and power is generated, and the shaft seal is arranged so as to seal the outer-peripheral side of the rotation shaft of the gas turbine.

Typically, the gas turbine comprises moving blades and stationary blades alternately arranged from a high-pressure stage to a low-pressure stage along the turbine shaft; and the shaft seal is arranged between the rotation shaft and one or more stationary blades.

The shaft seal may be fixed to the top end of the stationary blade. Preferably, the shaft seal is provided at least between the stationary blade of the most high-pressure side and the rotation shaft.

More specifically, the turbine comprises a casing, a compressor, a rotation shaft, moving blades attached to the rotation shaft, and stationary blades attached to the casing in a manner such that the stationary blades face the moving blades, wherein:

the shaft seals are provided between a plurality of stationary blades and the rotation shaft wherein the leaves of each shaft seal contact the rotation shaft;

under the rated operating conditions, the top ends of the leaves slightly separate from the surface of the rotation shaft due to the dynamic pressure generated by the rotation of the rotation shaft; and when the turbine is not operated, the top ends of the leaves contact the rotation shaft again due to the elastic restoring force of the leaves.

According to this structure, the above-described effects can be obtained.

The present invention also provides a remodeling method comprising a step of exchanging an existing shaft seal (in particular, a conventional labyrinth or brush seal) arranged around a shaft of a turbine for a shaft seal according to the present invention.

BRIEF DESCRIPTION OF THE DRAWINGS

FIG. 1A is perspective view showing the structure of the leaf seal.

FIG. 4A is a perspective view showing the structure of the leaf seal, FIG. 4B is a cross-sectional view showing the leaves as constituents of the leaf seal, and FIG. 4C is an enlarged view of a distinctive portion in FIG. 4B.

FIG. 6A shows a state before the processing or working, FIG. 6B shows a state during the processing, and FIG. 6C shows a state after the processing.

FIG. 7A is an enlarged perspective view showing the inner-peripheral top end of each leaf of the leaf seal, and FIG. 7B shows the pressure distribution.

FIG. 8A is an enlarged perspective view showing the inner-peripheral top end of each leaf of the leaf seal, and FIG. 8B shows the pressure distribution.

FIG. 18A is a perspective view showing the structure of the leaf seal, and FIG. 18B is a cross-sectional view showing the leaves as constituents of the leaf seal.

FIG. 19A is a perspective view showing the structure of the leaf seal, and FIG. 19B is a cross-sectional view showing the leaves as constituents of the leaf seal.

FIG. 20A is a perspective view showing the structure of the leaf seal, FIG. 20B is a cross-sectional view showing the leaves as constituents of the leaf seal, and FIG. 20C is a cross-sectional view in face D—D of FIG. 20B.

FIGS. 23A to 23D are diagrams showing the structure of the leaves shown in FIG. 22. FIG. 23A is a plan view of the leaf, FIG. 23B is a cross-sectional view along arrow B—B in FIG. 23A, FIG. 23C is a plan view of a variation of the leaf in which the positions of the protruding portions are different from those shown in FIG. 23A, and FIG. 23D is a cross-sectional view along arrow C—C in FIG. 23C.

FIG. 37A is a cross-sectional view of the brush seal, and FIG. 37B is a cross-sectional view along arrow B—B in FIG. 37A.

MODES FOR CARRYING OUT THE INVENTION

Hereinbelow, preferred embodiments of the present invention will be explained in detail with reference to the drawings.

First embodiment

The structure of the shaft seal and the gas turbine as the first embodiment will be explained with reference to FIGS. 1A, 1B and 2.

Figure 2:
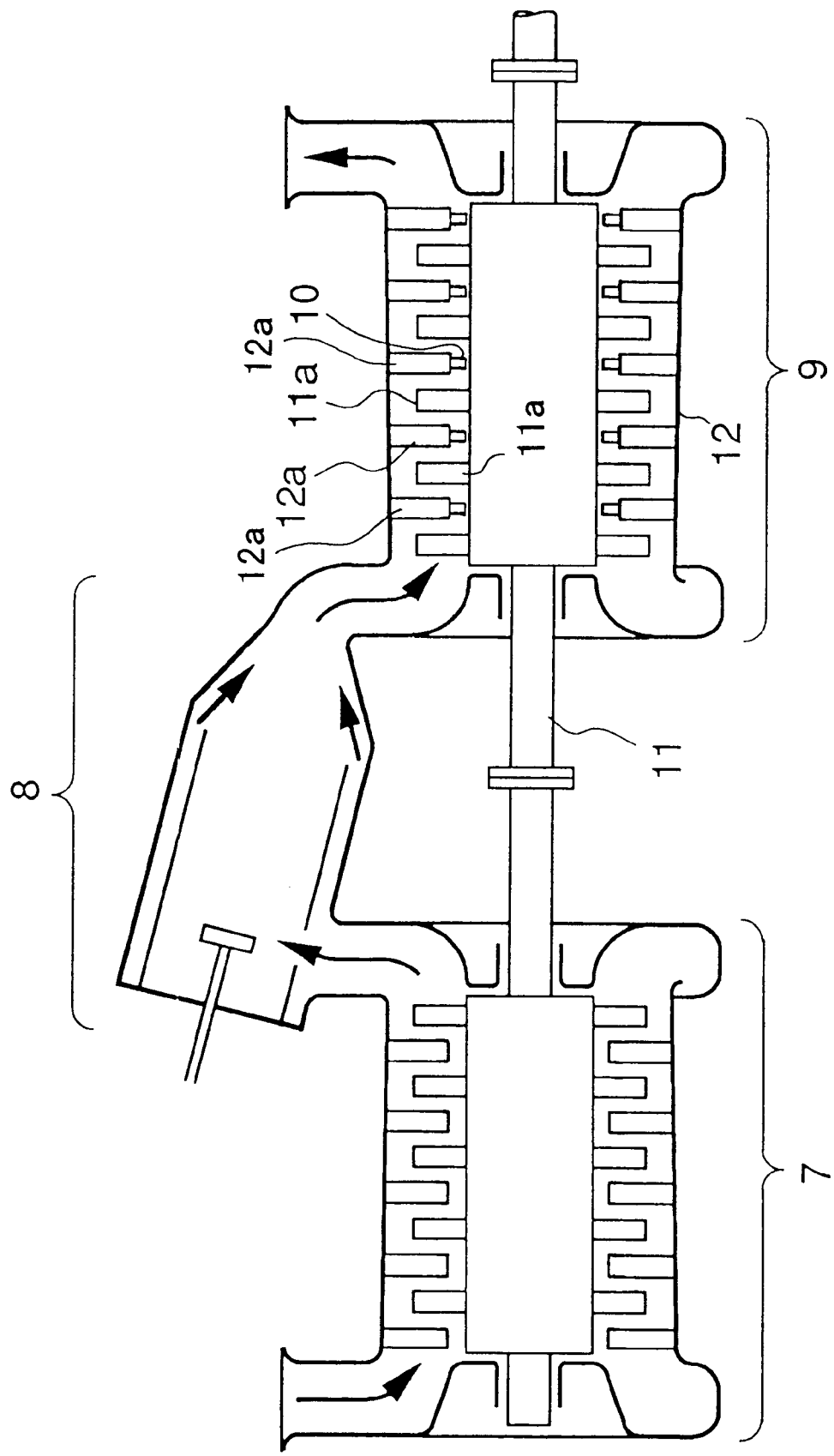
FIG. 2 is a diagram showing the general structure of a gas turbine employing a shaft seal according to the present invention.

FIG. 2 shows the general structure of the gas turbine. In the figure, reference numeral 7 indicates a compressor, reference numeral 8 indicates a combustor, and reference numeral 9 indicates a turbine. The compressor 7 draws in a large amount of air and compresses it. In general gas turbines, a part of the power obtained using the rotation shaft (i.e., shaft 11 explained later) is used as the power of the compressor. The combustor 8 makes the compressed air (compressed by the compressor 7) burn by mixing the air with fuel. The turbine 9 draws in the combustion gas generated by the combustor 8 and makes the air expand, and blasts the expanded air against the moving blades 11a fixed to the rotation shaft 11, so as to convert the thermal energy of the combustion gas into the mechanical rotational energy and to generate the power.

In addition to the moving blades 11a at the rotation shaft 11 side, the turbine 9 also has stationary blades 12a at the casing 12 (explained later) side. These moving blades 11a and stationary blades 12a are alternately arranged in the axial direction of the rotation shaft 11. The pressure caused by the combustion gas which flows in the axial direction of the rotation shaft 11 is applied to the moving blades 11a so that the rotation shaft 11 is rotated and the rotational energy generated in the rotation shaft can be extracted from the end of the shaft and be used.

Between each stationary blade 12a and the rotation shaft 11, leaf seal 10 is provided as a shaft seal (structure) for reducing the leakage of the combustion gas from the high-pressure side to the low-pressure side.

Figure 1A:
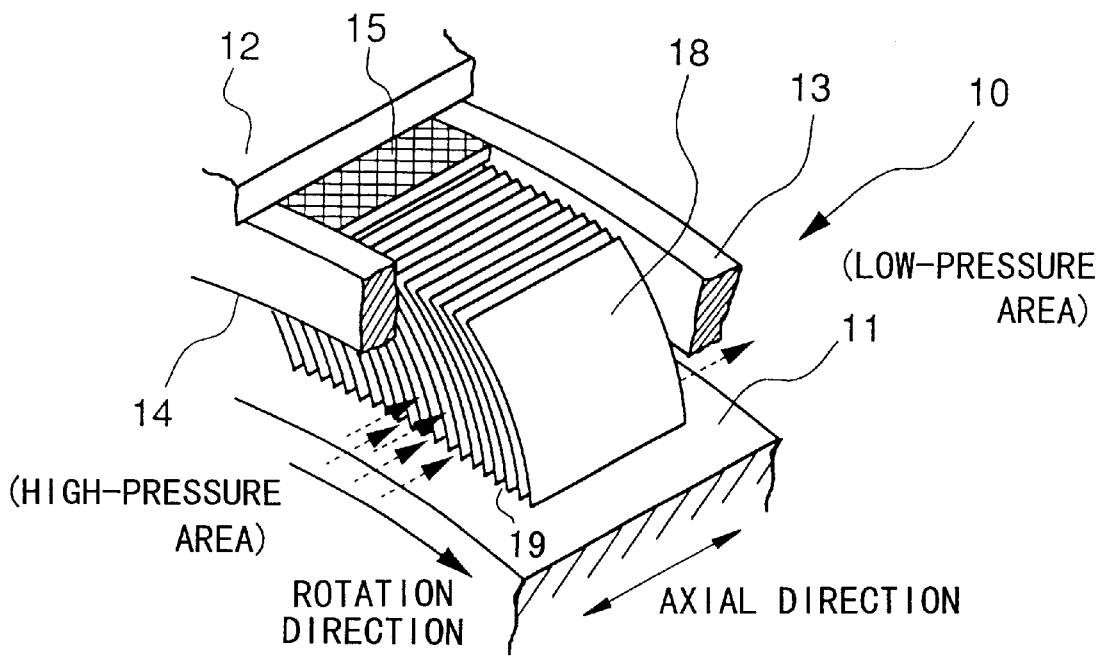
FIG. 1A is a diagram showing the structure of the leaf seal (i.e., shaft seal) as the first embodiment according to the present invention.
Figure 1B:
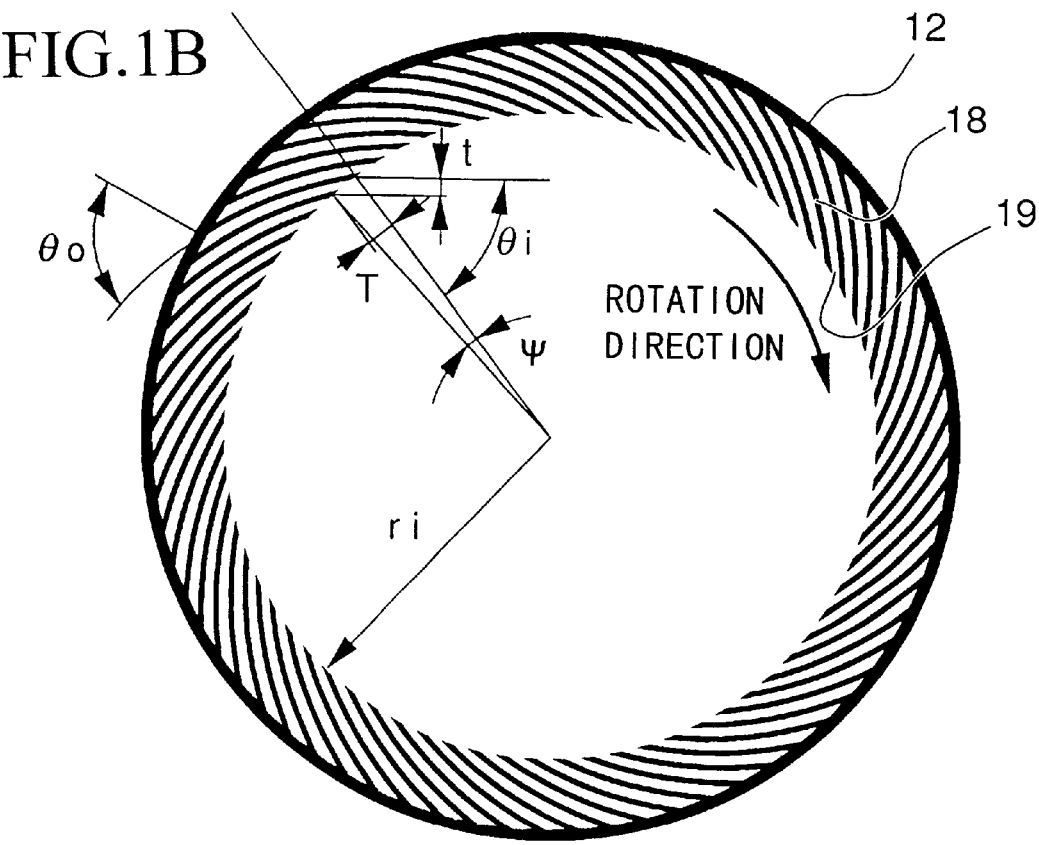
FIG. 1B is a cross-sectional view showing the leaves as constituents of the leaf seal.

FIGS. 1A and 1B show the structure of this leaf seal. FIG. 1A is a perspective view showing the structure of the leaf seal, while FIG. 1B is a cross-sectional view showing a plurality of thin plates as constituents of the leaf seal. The above perspective view is partially broken so as to clearly show and explain the main portion of the structure, and such a partially-broken view is basically employed in the following embodiments.

In FIGS. 1A and 1B, reference numeral 11 indicates a rotation shaft, reference numeral 11 indicates a casing, reference numeral 13 indicates a low-pressure side end plate, reference numeral 14 indicates a high-pressure side end plate, reference numeral 15 indicates a brazed portion, reference numeral 18 indicates thin plates (i.e., leaves), and reference numeral 19 indicates a gap between two adjacent leaves. As shown in FIG. 1A, leaf seal 10 has a structure in which plate-shape leaves 18 having a specific width in the axial direction of the rotation shaft 11 are arranged in a manner such that the leaves are multi-layered in the circumferential direction of the rotation shaft 11.

The leaves 18, only the base ends of which are brazed to casing 11 (see brazed portion 15), seal an outer peripheral area of the rotation shaft 11 so that the relevant space around the rotation shaft 11 is divided into a high-pressure area and a low-pressure area. At both sides of the leaves 18, high-pressure side end plate 14 and low-pressure side end plate 13 are respectively provided as guide plates with respect to the pressure acting direction for the high-pressure and low-pressure areas.

The leaves 18 are designed to have a specific rigidity, dependent on the plate thickness, in the circumferential direction of the rotation shaft 11. In addition, the leaves 18 are fixed to casing 11 in a manner such that the leaves are inclined with respect to the rotation direction of the rotation shaft 11 so as to make an acute angle with the outer-peripheral surface of the shaft. When the rotation shaft 11 stops, the ends of leaves 18 contact the rotation shaft 11 by receiving a specific pre-load, while when the rotation shaft 11 is rotated, the leaves 18 do not contact the rotation shaft 11 because the ends of the leaves 18 separate from the surface of the shaft due to the dynamic pressure generated by the rotation of the rotation shaft 11.

Between adjacent leaves 18, a very small gap 19 is provided. As shown in FIG. 1B, each gap has substantially the same width both at the inner-peripheral top-end side and the outer-peripheral base-end side of leaves 18. As for the radial coordinate r, the angle $\theta$ between each tangent of leaf 18 and the line from the center of the circle to the relevant point of leaf 18 is determined under the following conditions:

$$\sin \theta_i = t/T = t/(r_i \psi)$$

$$t/\psi = r_i \sin \theta_i = r \sin \theta$$

$$\sin \theta = r_i \sin \theta_i / r$$

where t indicates the sum of thickness $t_b$ of leaf 18 and width $t_s$ of gap 19, $\psi$ indicates the central angle between adjacent leaves 18, T indicates the width ($=r_i\psi$) between adjacent leaves 18 along the inner circumference, $\theta_i$ indicates the angle of the top end of leaf 18, and $\theta_0$ indicates the angle of the base end of leaf 18. The leaves 18 are designed based on the above formula, thereby fixing the width of gap 19 between adjacent leaves, at both the outer-peripheral side and the inner-peripheral side.

In the above-explained shaft seal structure and gas turbine, leaves 18 having a predetermined width in the axial direction of the rotation shaft 11 are multi-layered in the circumferential direction of the rotation shaft 11, and thus leaves 18 have flexibility in that circumferential direction, and have high rigidity in the axial direction of the shaft.

According to the present shaft seal, the sealing component, that is, leaves 18 are arranged in the axial direction of the rotation shaft 11 so that the outer-peripheral side brazed portion fixed to casing 11 is rigid in the axial direction of the rotation shaft 11. Therefore, it is possible to prevent leaves 18 from detaching from the casing 12, as observed in the conventional brush seal in which wires may detach from the casing. In addition, gap 19 is provided, by which the seal structure is firmly maintained during the rotation, thereby improving the durability.

The top ends of leaves 18 have high rigidity in the axial direction of the rotation shaft 11 and have flexibility in the circumferential direction of the shaft; thus, these ends are not easily deformed in the direction in which the differential pressure is applied, in comparison with the conventional brush seal. Accordingly, the present leaf seal can be used for sealing a portion having a greater differential pressure.

When the vibration of the rotation shaft 11 is large near the resonance point or the like, leaves 18 are deformed and the contact state with the rotation shaft 11 is eased. In addition, under the rated conditions, the ends of the leaves 18 separate from the surface of the shaft due to the dynamic pressure generated by the rotation of the rotation shaft 11. Therefore, it is possible to prevent excessive heating and abrasion caused by the contact of the leaves 18 and the rotation shaft 11. Furthermore, according to the prevention of the heating due to the contact between the leaves 18 and the rotation shaft 11, vibration generated depending on the thermal balance in the rotation shaft 11 can also be prevented.

In addition, the width of each gap between the leaves is fixed both in the outer-peripheral side and the inner-peripheral side; thus, leaves 18 can be much more closely arranged and the gap between the top ends of the leaves 18 and the rotation shaft 11 can be remarkably smaller in comparison with the conventional non-contact labyrinth seal, or the like. Accordingly, the leakage of the present leaf seal can be reduced to approximately ⅓ to ¹⁄₁₀ as much as the leakage of the labyrinth seal, and as a result, the efficiency of (the shaft of) the gas turbine can be improved by approximately 1%.

The above efficiency of the gas turbine is defined by "shaft output (or shaft horsepower)/fuel calorie". Generally, the above efficiency is 38 to 40% (measured using a gas turbine employing the conventional labyrinth seal), and it is difficult to realize a higher efficiency in the conventional technique. However, when the shaft seal according to the present invention is used, the efficiency can be further improved to 39 to 41% (measured by arranging the present leaf seals at the first, second, and third-stage stationary blades).

Consequently, the efficiency can be improved by approximately 1% in comparison with the conventional type. The possible saving according to this improvement (of 1%) will be estimated as follows: In an example of the combined cycle power system (power output: 1,610 thousand kw), the fuel saving according to the above improvement is estimated at approximately 35 thousand tons per year.

Figure 3:
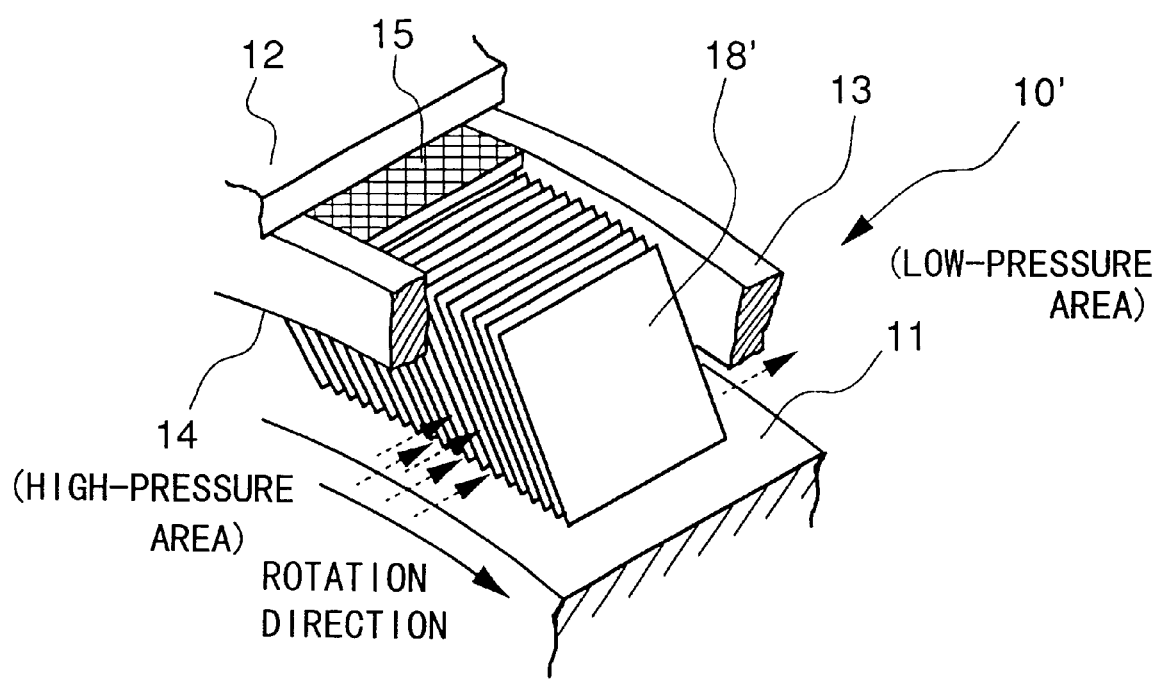
FIG. 3 is a perspective view showing the structure of the leaf seal as a variation of the first embodiment.

In the above embodiment, all leaves 18 are uniformly curved so as to fix each gap 19 between adjacent leaves. However, when the outer diameter of the rotation shaft 11 is relatively large, each gap between the leaves can be regarded approximately the same even with non-curved leaves. Therefore, leaf seal 10' as shown in FIG. 3 may be employed, in which flat plate-shape leaves 18' are provided on the inner surface of casing 12. The shape of the leaves will also be described in the following embodiments.

Second embodiment

Below, the structure of the gas turbine as the second embodiment according to the present invention will be explained. The basic structure of the present gas turbine and leaf seal is the same as that of the first embodiment, and structural elements corresponding to each other have the identical reference numerals, and explanations thereof are omitted. That is, each effect described above can also be obtained in the present embodiment. In addition, a similar omission will be performed in the following embodiments.

Figure 4A:
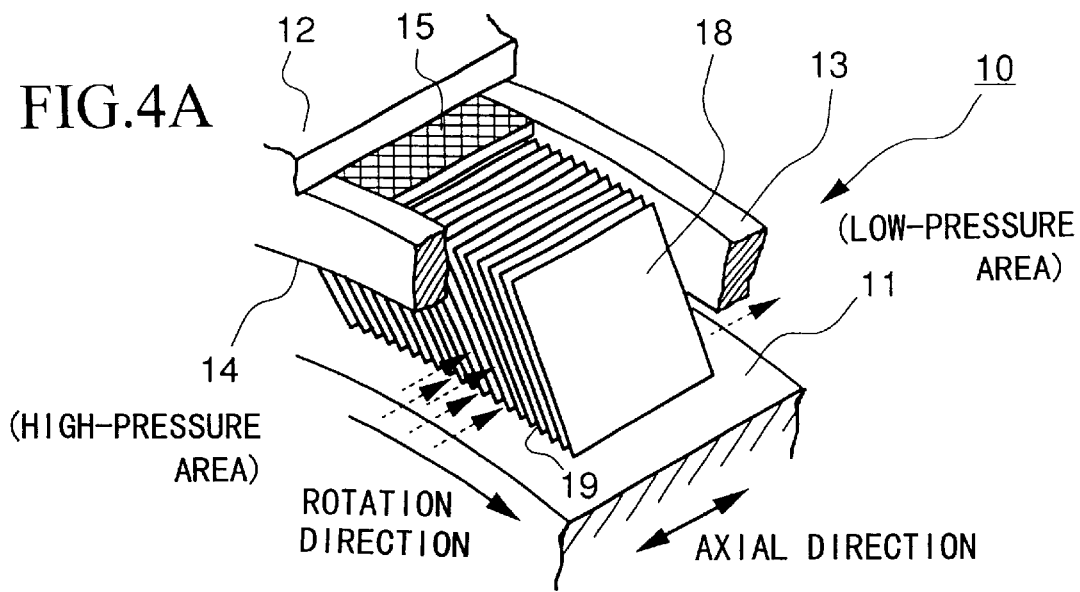
FIGS. 4A to 4C are diagrams showing the structure of the leaf seal as the second embodiment of the present invention.
Figure 4B:
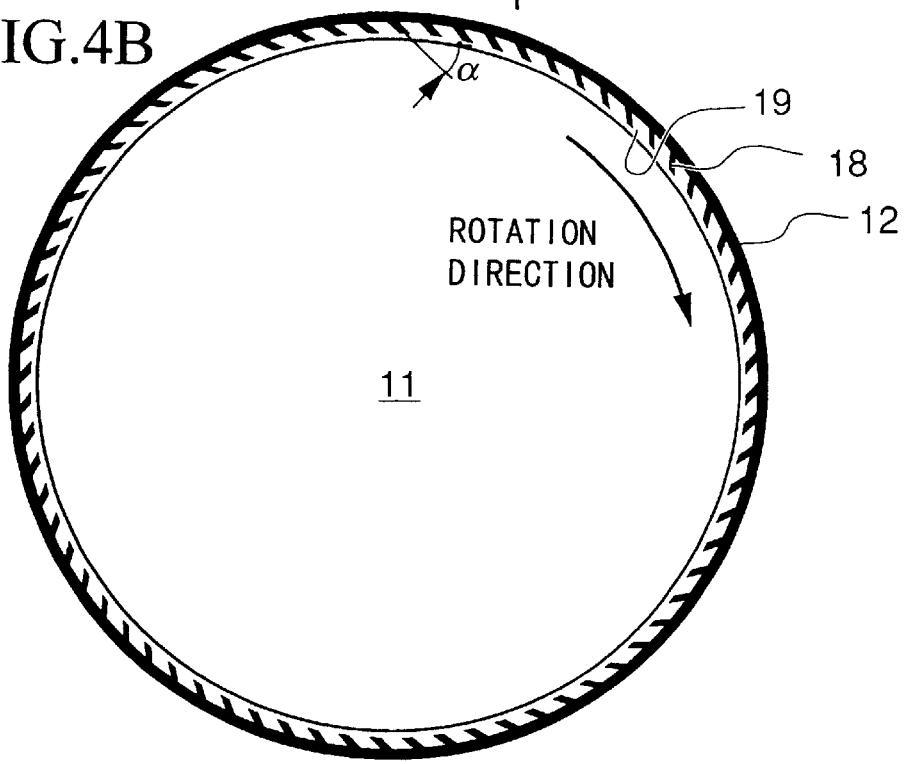
Figure 4C:
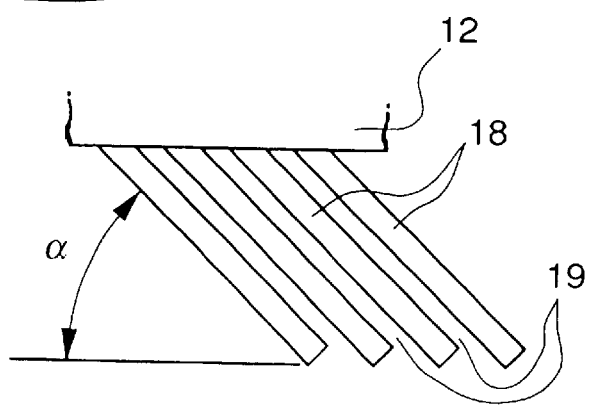

FIGS. 4A to 4C show the structure of leaf seal 10 of the second embodiment. FIG. 4A is a perspective view showing the structure of the leaf seal, FIG. 4B is a cross-sectional view showing the leaves as the constituents of the leaf seal, and FIG. 4C is a partially enlarged view for explaining a distinctive portion of FIG. 4B.

In the present embodiment, leaves 18 of leaf seal 10 are attached to casing 11 in a manner such that angle α between the rotation direction and the peripheral surface of the rotation shaft 11 (see FIG. 4C) is an acute angle from 30 to 45 degrees.

The width of each gap 19 between multi-layered leaves 18 can be regarded as substantially the same from the outer-peripheral base-end side to the inner-peripheral top-end side because the "seal" diameter, that is, the diameter of the rotation shaft 11 is sufficiently large.

In addition, leaves 18 are brazed to the casing 11 in a manner such that angle α between the rotation direction and the peripheral surface of the rotation shaft 11 is an acute angle from 30 to 45 degrees; thus, the resistance of leaves 18 with respect to the rotation of the rotation shaft 11 is not large. According to an experiment performed by the inventors, if the angle α is smaller than 30°, the top ends of leaves 18 may be too far from the surface of the rotation shaft 11 due to the dynamic pressure; thus, the sealing capability may be degraded. On the contrary, if the angle α is larger than 45°, the leaves 18 may contact the rotation shaft 11 when the shaft vibrates, and thus leaves 18 may provide resistance to the rotation of the rotation shaft 11.

Consequently, under the above conditions of an acute angle from 30 to 45 degrees, it is possible to reliably prevent the above-explained excessive heating or abrasion due to the contact of the leaves 18 to the rotation shaft 11, or vibration generated depending on the thermal balance of the rotation shaft 11.

In the present embodiment, the seal diameter is sufficiently large; thus, each gap 19 can be significantly the same from the outer-peripheral side to the inner-peripheral side even though flat plate-shape leaves 18 are used. However, if the seal diameter is relatively small, uniformly-curved leaves 18, which have a circular-arc shape (that is, the curvature gradually changes in the radial direction), are preferably used as in the first embodiment. In this way, even if the outer diameter of the rotation shaft 11 is relatively small, the width of the gap between the leaves can be approximately fixed.

Third embodiment

Below, the structure of the gas turbine as the third embodiment according to the present invention will be explained.

The leaf seal 10 provided in the present gas turbine has the same basic structure as that shown in FIG. 4A of the above second embodiment, that is, the leaves 18 are attached to casing 11 in a manner such that angle α between the rotation direction and the peripheral surface of the rotation shaft 11 is a predetermined acute angle.

Figure 5:
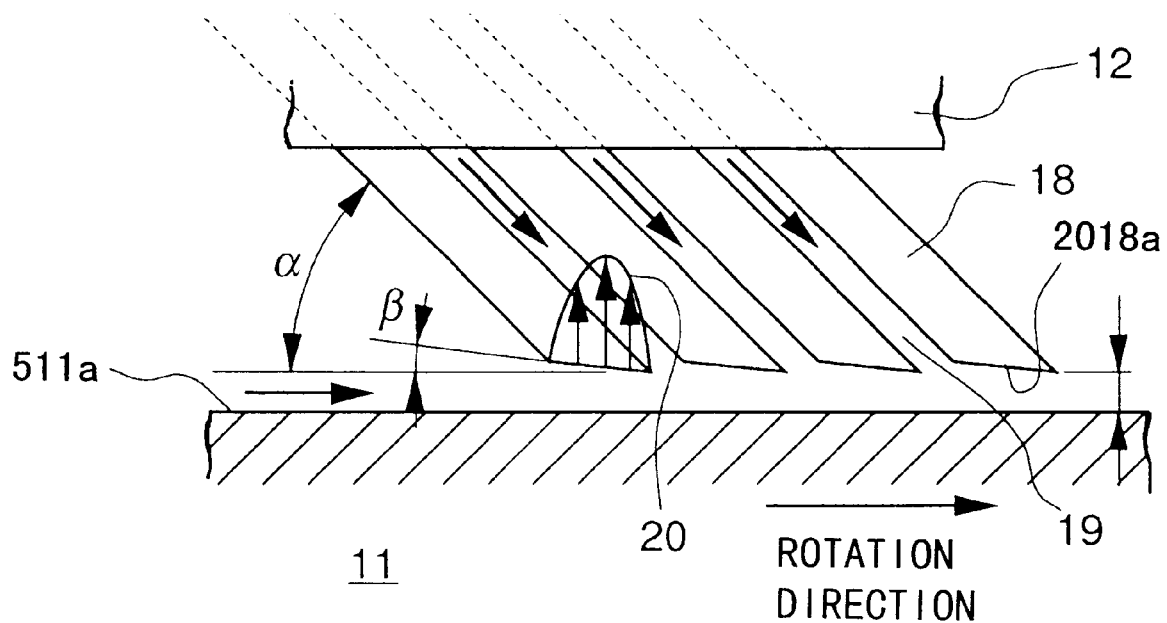
FIG. 5 is an enlarged view showing the leaves of the leaf seal as the third embodiment of the present invention.

In addition to that, as shown in FIG. 5C (partially enlarged view), the top-end portion of each leaf 18 (i.e., at the rotation shaft 11 side) has slope 2018a functioning as the buoyancy providing means of the present invention. In this slope 2018a, the distance between the top point of the leaf and the peripheral surface 511a of the rotation shaft 11 gradually decreases along the rotation direction, and the angle β with respect to the peripheral surface 511a is very small.

According to the above structure, when the rotation shaft 11 is rotated, that is, when the gas turbine is operated, the top ends of leaves 18 are separated by receiving not only the dynamic pressure generated by the rotation of the rotation shaft 11 (because the leaves 18 are attached at an acute angle α), but also the dynamic pressure caused by the wedge effect. Here, the wedge effect is obtained because the distance between slope 2018a and peripheral surface 551a gradually decreases along the rotation direction, and thus buoyancy according to the pressure distribution 20 (see FIG. 5) is added. Therefore, the leaves 18 and the rotation shaft 11 are much more easily separated from each other.

Below, the method of forming the above slope at the top end of leaf 18 will be explained with reference to FIGS. 6A to 6C.

Figure 6A:
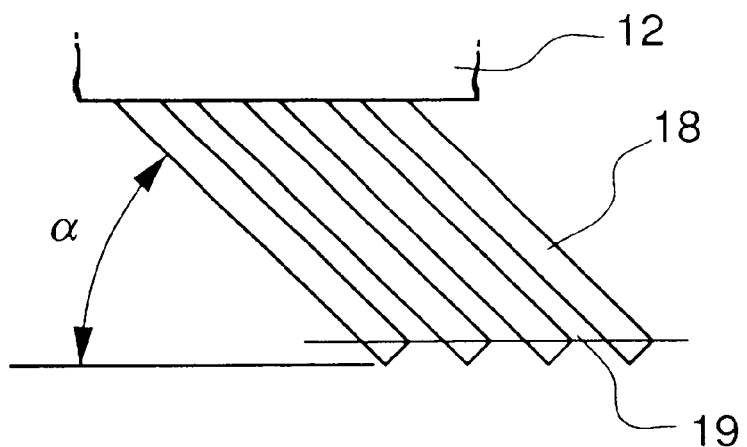
FIGS. 6A to 6C are diagrams for explaining the method of forming a slope at the top end of each leaf of the leaf seal in the third embodiment.

The slope 2018a is formed at the top end (i.e., the inner-peripheral side or the rotation shaft 11 side) of flat plate-shape leaf 18, and the first process is performed after the outer-peripheral base ends of leaves 18 are brazed to predetermined positions of casing 11 with a predetermined acute angle (see FIG. 6A). Here, the leaves 18 are attached at an acute angle α with respect to the peripheral surface 511a, and the top ends of the leaves 18 are processed using a discharge polishing method or a grinding method so as to form slope 2018a.

Figure 6B:
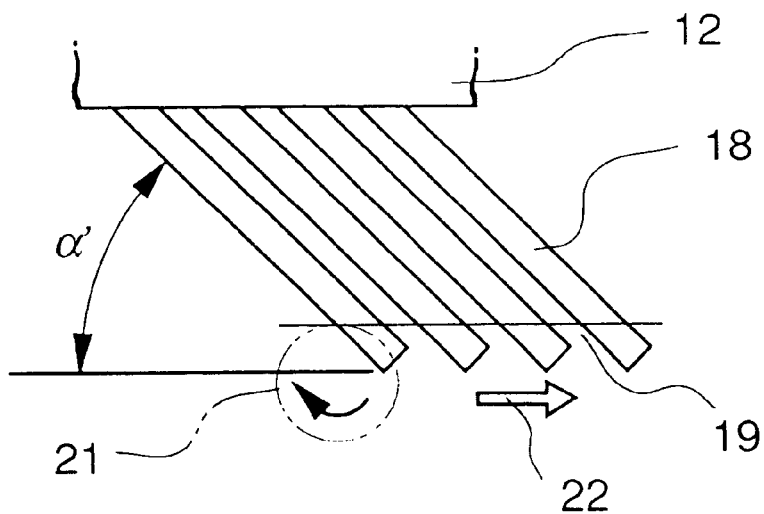

FIG. 6B simply shows the process using the grinding method, and reference numeral 21 in the figure indicates a grindstone. The rotating grindstone 21 proceeds in the direction 22 indicated by the outline arrow, that is, in the same direction as the rotation direction of the rotation shaft 11, substantially in parallel with the peripheral surface 511a of the rotation shaft 11, so that the top ends of leaves 18 are ground. In this process, the inner-peripheral ends of leaves 18, which are free ends, are pushed and held up by grindstone 21; thus, the grinding process is performed under another angle condition α' (shifted from angle α). Therefore, the processed slope 2018a is substantially parallel with the peripheral surface 511a while the leaves 18 are inclined by angle α'.

If the discharge polishing method is adopted for forming slope 2018a, the angle of inclination of the leaves 18 is shifted in advance from α to α' and the angle α' is maintained during the process by using a suitable tool or the like.

Figure 6C:
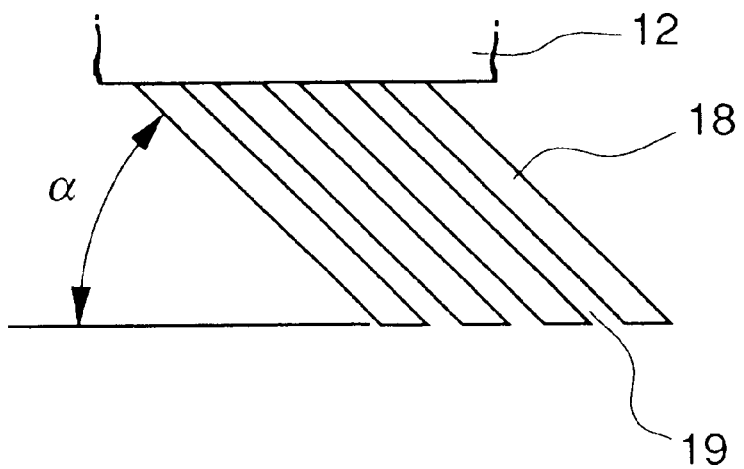

FIG. 6C shows the leaves after the process, that is, the angle of inclination is returned from α' to α by releasing the held-up state produced by using grindstone 21 (in the grinding method), or by using a tool (in the discharge polishing method). As a result, the slope 2018a processed with the inclination angle α' and substantially in parallel with the peripheral surface 511a of the rotation shaft 11 has a small angle β with respect to the peripheral surface 511a, where β corresponds to the difference between angles α and α'.

According to the above-explained slope-forming methods, it is possible to easily form slope 2018a by processing the top free ends (at the rotation shaft 11 side) of leaves 18.

Consequently, when the gas turbine is operated, buoyancy acts on the leaves 18 (attached with an acute angle) in accordance with the dynamic pressure caused by the rotation of the rotation shaft 11, and the top ends also experience buoyancy according to the above-explained slope 2018a. As a result, the leaves 18 experience the above buoyancy and are easily separated from the rotation shaft 11.

Some variations may be used as the buoyancy providing means.

Figure 7A:
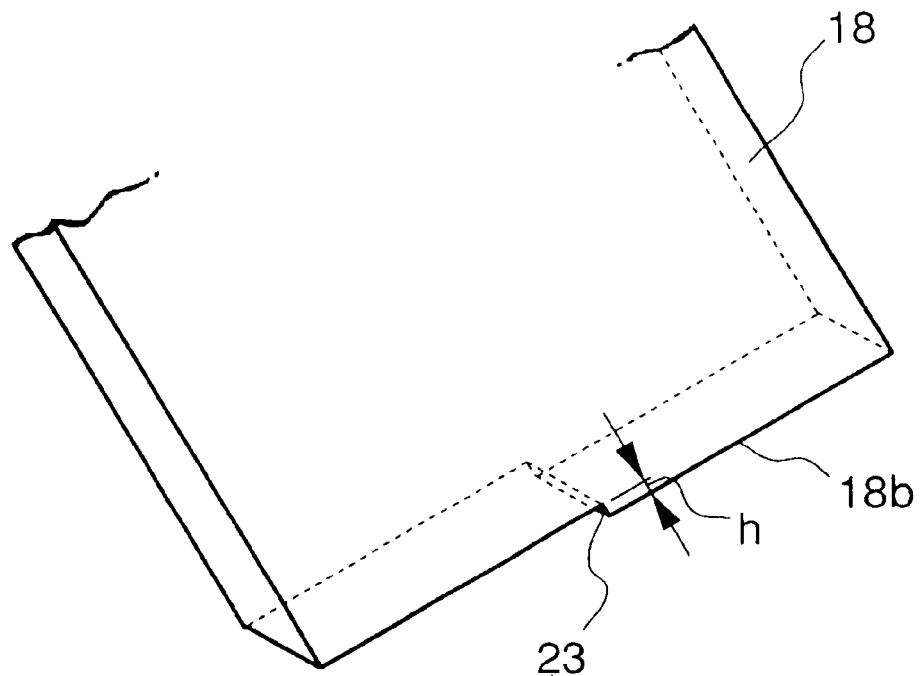
FIGS. 7A and 7B show another example of the buoyancy providing means in the third embodiment.
Figure 7B:
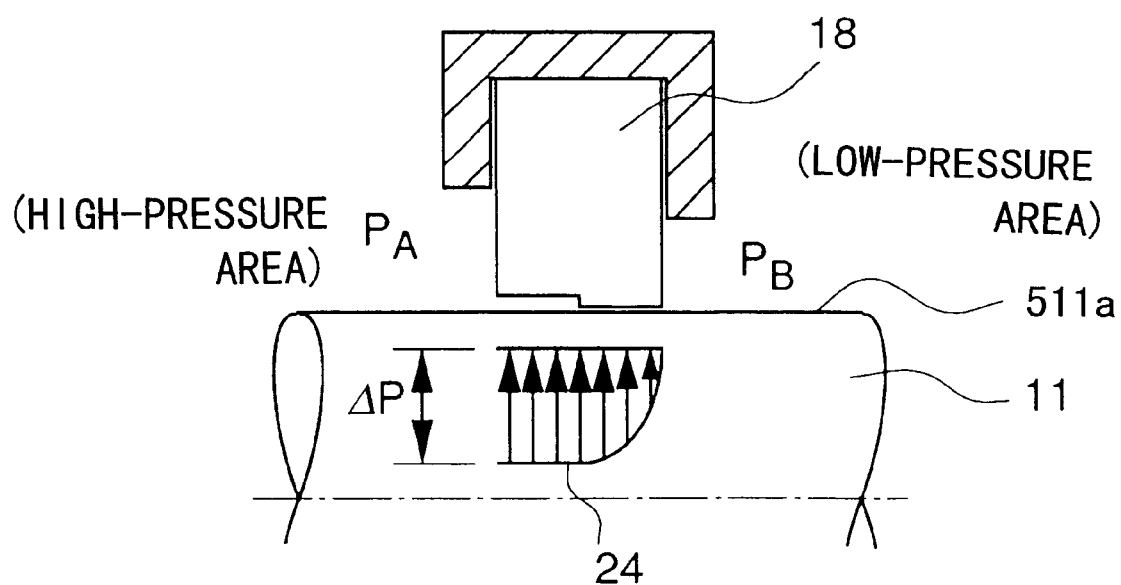

FIGS. 7A and 7B show another example of the buoyancy providing means. In the example, the top-end face 18b (at the rotation shaft 11 side) of leaf 18 is parallel to the peripheral surface 511a, and a step 23 (height: h) is provided in the axial direction, by which the gap at the high-pressure side is larger than the gap at the low-pressure side, as shown in FIG. 7B.

According to the above step 23, differential pressure ΔP as indicated by the pressure distribution 24 shown in FIG. 7B is generated between the high-pressure and low-pressure areas, and this differential pressure functions as buoyancy for separating the top ends of leaves 18.

Here, the differential pressure ΔP in FIG. 7B is obtained by subtracting the pressure $P_B$ of the low-pressure area from pressure $P_A$ of the high-pressure area, that is, $\Delta P=P_A-P_B$.

Figure 8A:
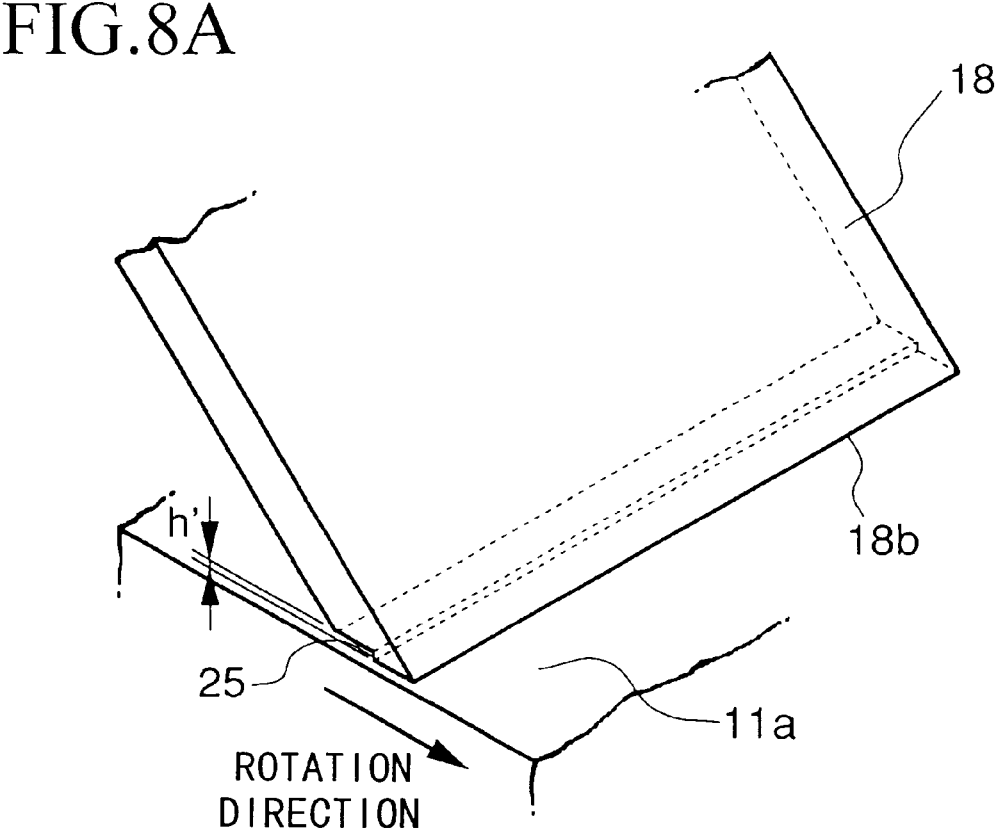
FIGS. 8A and 8B show a further example of the buoyancy providing means in the third embodiment.
Figure 8B:
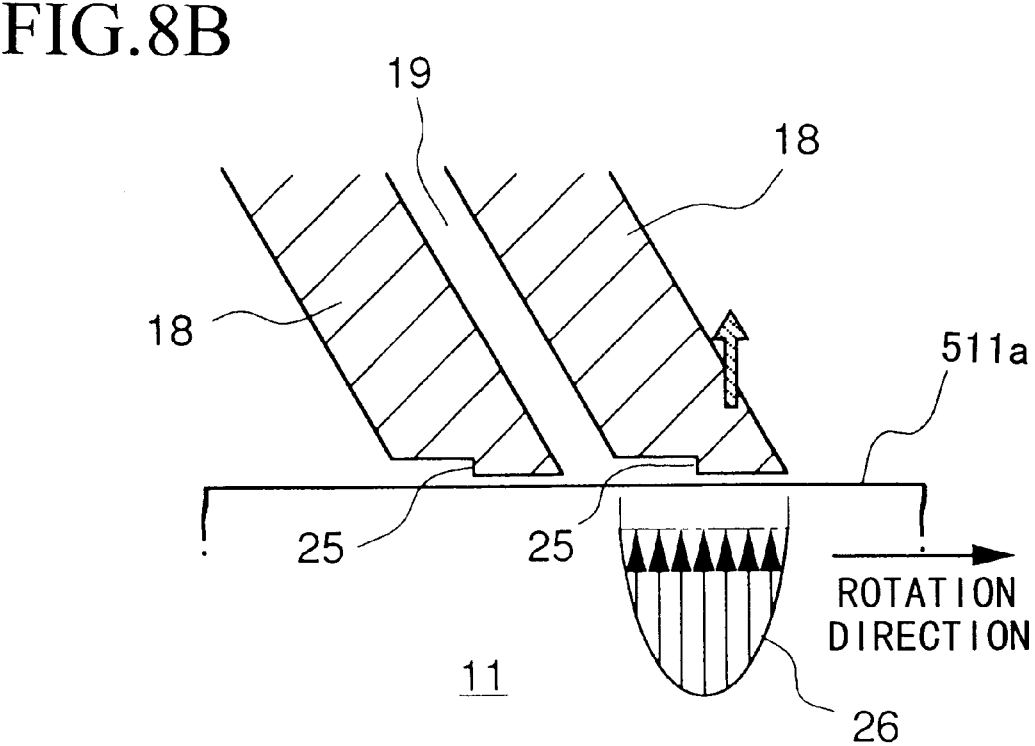

FIGS. 8A and 8B show a further example of the buoyancy providing means. In this example, the top-end face 18b (at the rotation shaft 11 side) of each leaf 18 is parallel to peripheral surface 511a, and has a step 25 (height: h') in the circumferential direction, by which the gap at the front side in the rotation direction is narrower than the gap at the rear side, as shown in FIG. 8B.

According to the above step 25, buoyancy indicated by pressure distribution 26 (shown in FIG. 8B) acts on the top ends of leaves 18 due to the dynamic pressure generated by the rotation of the rotation shaft 11.

Also in the above example of providing the axial-direction step 23 or circumferential-direction step 25, when the gas turbine is operated, buoyancy acts on the leaves 18 (attached with an acute angle) in accordance with the dynamic pressure caused by the rotation of the rotation shaft 11, and the top ends also experience buoyancy, as in the case of providing slope 2018a. Accordingly, the leaves 18 experience the above buoyancy and are easily separated from the rotation shaft 11.

Fourth embodiment

Below, the structure of the gas turbine as the fourth embodiment according to the present invention will be explained.

The leaf seal 10 provided in the gas turbine of the present embodiment also has the same basic structure shown in FIG. 4A referred to in the above second embodiment, that is, the leaves 18 are attached to casing 11 in a manner such that the angle α between the rotation direction and the peripheral surface of the rotation shaft 11 is a predetermined acute angle.

Figure 9:
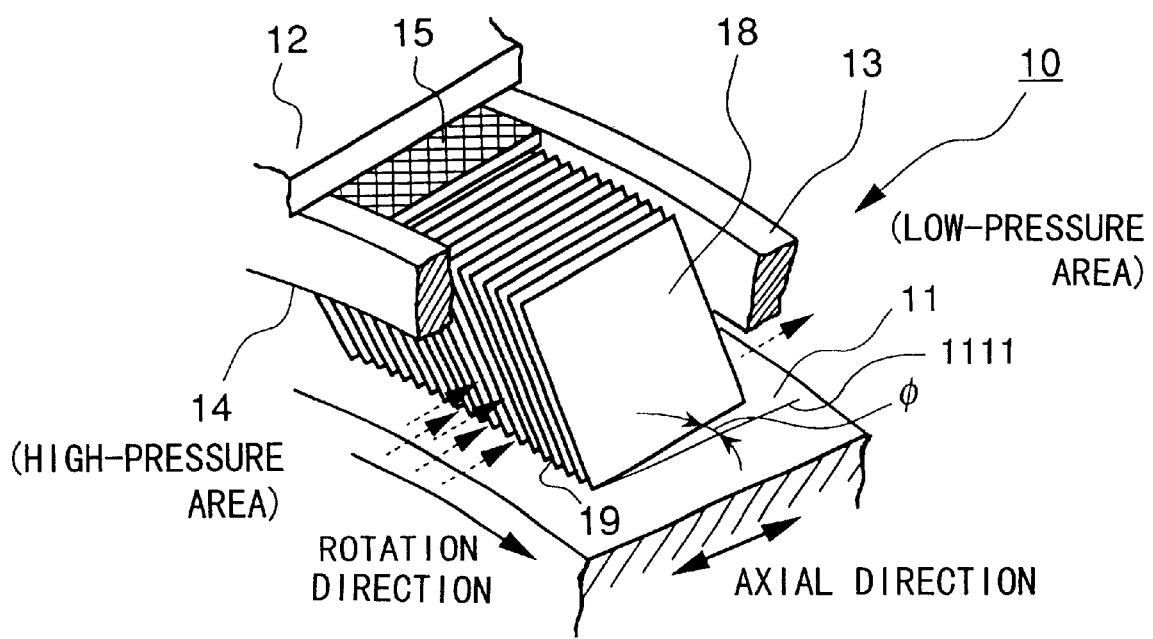
FIG. 9 is a perspective view showing the structure of the leaf seal as the fourth embodiment of the present invention.

In addition to that, as shown in FIG. 9, the top end of each leaf 18 is arranged to slide with angle φ with respect to line 1111 (on the peripheral surface of the rotation shaft 11) in parallel with the axis of the shaft 11. The top ends of leaves 18 are separated from the rotation shaft 11 when the leaves receive the pressure from the high-pressure area.

Figure 10:
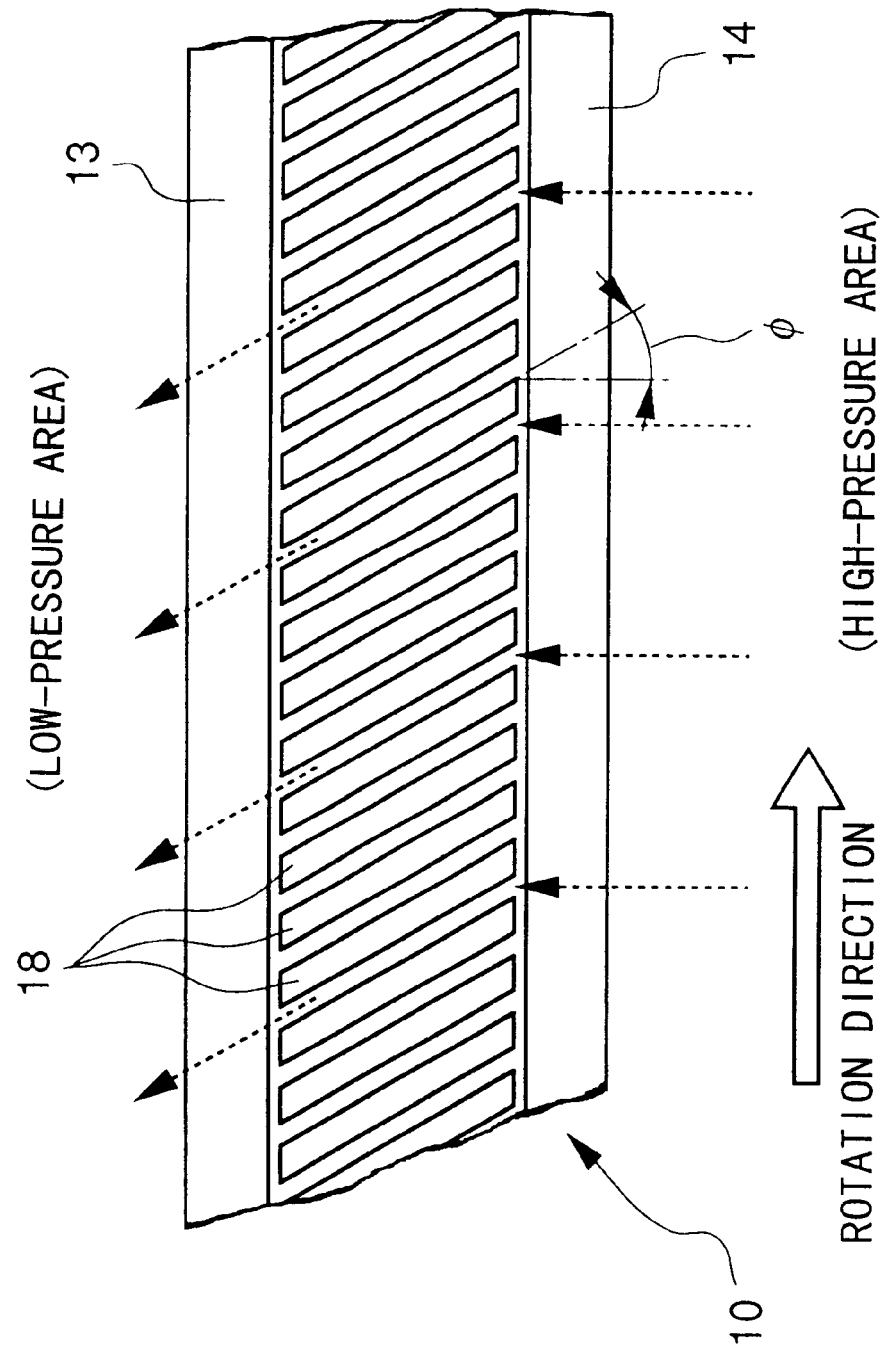
FIG. 10 is a diagram showing the leaves as constituents of the leaf seal of the fourth embodiment.

According to the above arrangement having angle φ, as shown in FIG. 10, the length of the passage between adjacent leaves 18 is longer than the length of the axial direction, thereby increasing the resistance of the passage. Accordingly, the leakage form the high-pressure side to the low-pressure side can be reduced in the leaf seal 10.

Figure 11:
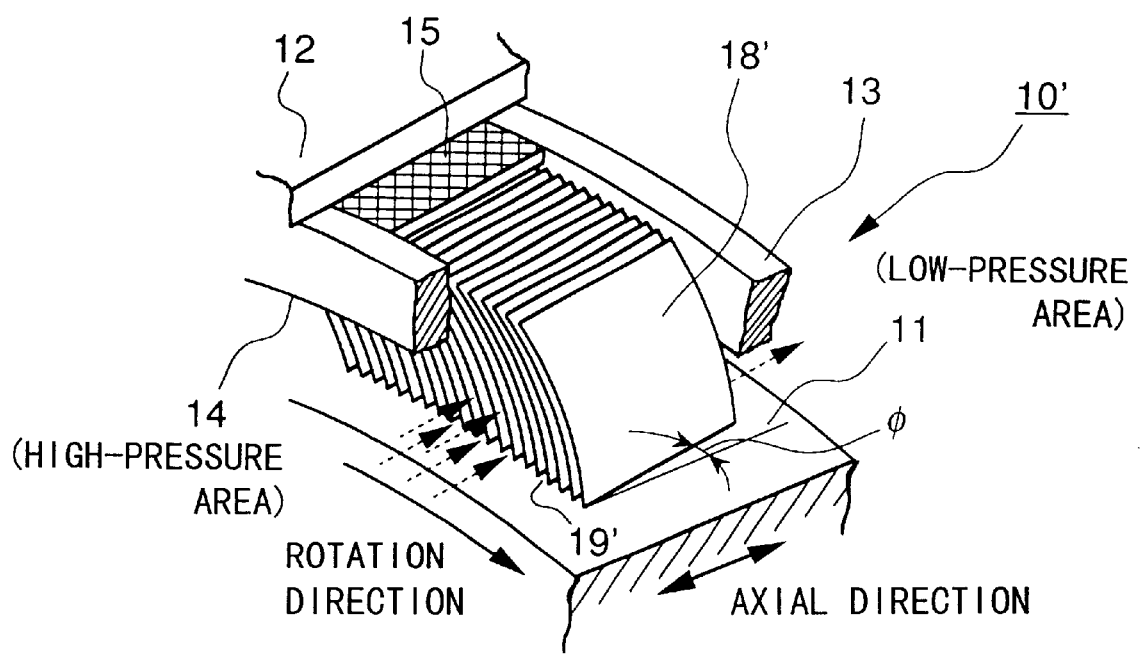
FIG. 11 is a perspective view showing the structure of the leaf seal as a variation of the fourth embodiment.

Also in the present embodiment, if the outer diameter of the rotation shaft 11 is relatively small, then in the leaf seal 10, uniformly-curved leaves 18' may be attached to the inner face of casing 11 (that is, all leaves are uniformly curved) so as to substantially fix the width of gap 19' between the leaves, as shown in FIG. 11.

Fifth embodiment

Below, the structure of the gas turbine as the fifth embodiment according to the present invention will be explained.

The leaf seal 10 provided in the gas turbine of the present embodiment also has the same basic structure shown in FIG. 4A referred to in the above second embodiment, that is, the leaves 18 are attached to casing 11 in a manner such that angle α between the rotation direction and the peripheral surface of the rotation shaft 11 is a predetermined acute angle.

Figure 12:
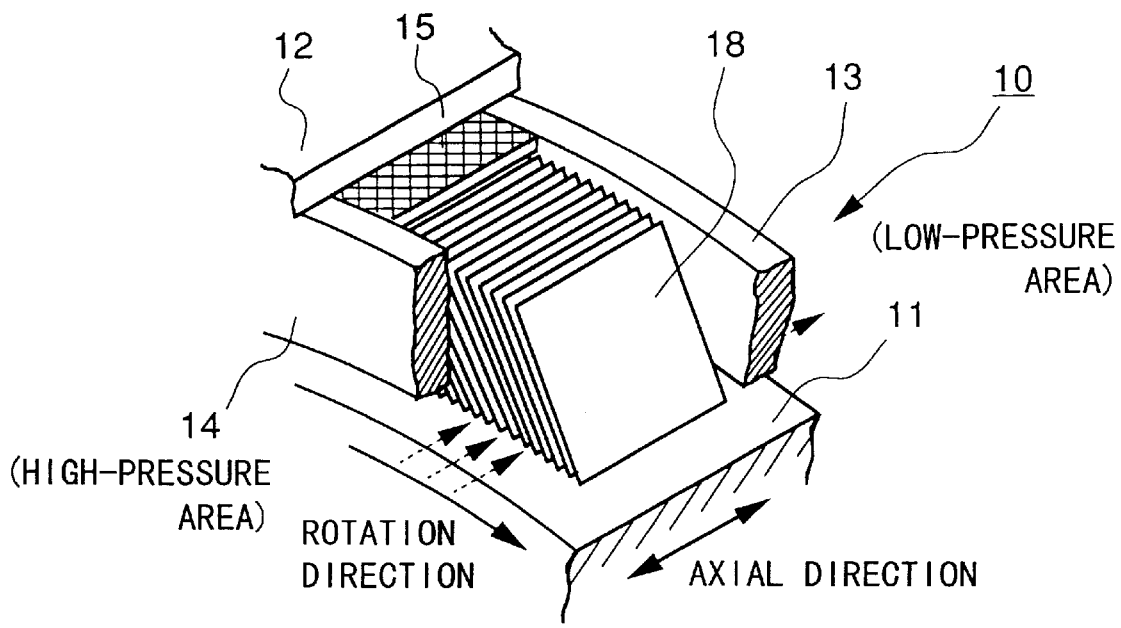
FIG. 12 is a perspective view showing the structure of the leaf seal as the fifth embodiment of the present invention.
Figure 13:
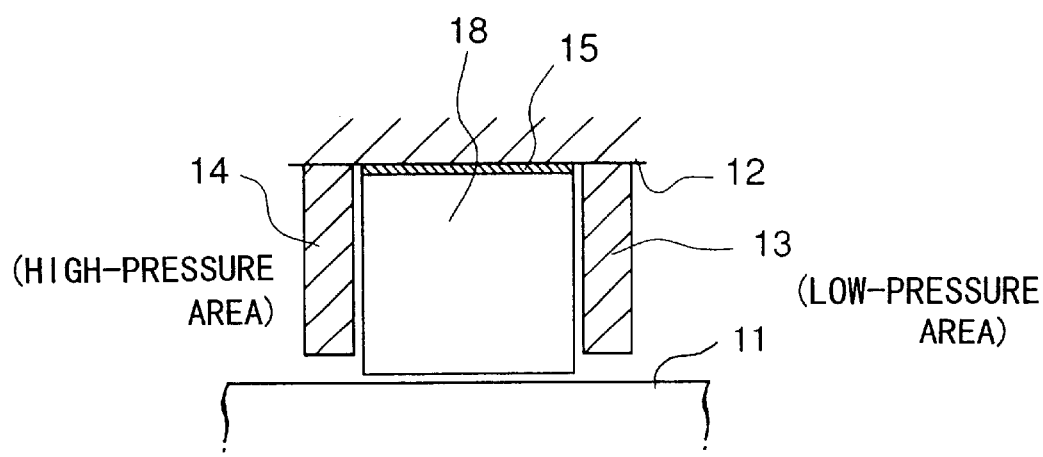
FIG. 13 is a cross-sectional view showing the arrangement of the end plates and leaves around the rotation shaft in the fifth embodiment.

FIG. 12 is a perspective view showing the structure of the shaft seal provided in the gas turbine of the present embodiment, and FIG. 13 is a cross-sectional view showing the end plates and leaves surrounding the rotation shaft 11.

As shown in these figures, low-pressure side end plate 13 and high-pressure side end plate 14 are respectively arranged at both sides of leaves 18, and along the whole circumference of the rotation shaft 11. In the present embodiment, the width of the gap between the leaves 18 and each end plate 13 or 14 is as narrow as possible for the leaves 18 to move, and the length of each end plate in the radial direction of the rotation shaft 11 is approximately the same as the length of the leaves in the radial direction.

Therefore, the distance between the end plate 13 and the rotation shaft 11 is the same as the distance between the end plate 14 and the rotation shaft 11, that is, at both sides of the leaves 18, the gap between the end plate and the rotation shaft 11 is the same, and has a width as narrow as possible for rotating the rotation shaft 11. Accordingly, the length of the passage generated around the leaves 18 can be increased and thus the resistance of the passage can be increased.

In addition, the width of the gap between the leaves 18 and end plate 13 is the same as that between the leaves and end plate 14; thus, it is possible to much more reliably preventing the leaves 18 from deforming towards the direction of the differential pressure.

Furthermore, the pressure applied to the leaves 18 from the high-pressure side and the suction force applied to the leaves from the low-pressure side are reduced by the low-pressure side end plate 13 and the high-pressure side end plate 14, so that the leaves 18 are not easily deformed towards the direction of the differential pressure.

According to the above structure, in the present leaf seal 10, it is possible to reduce the leakage from the high-pressure side to the low-pressure side.

Figure 14:
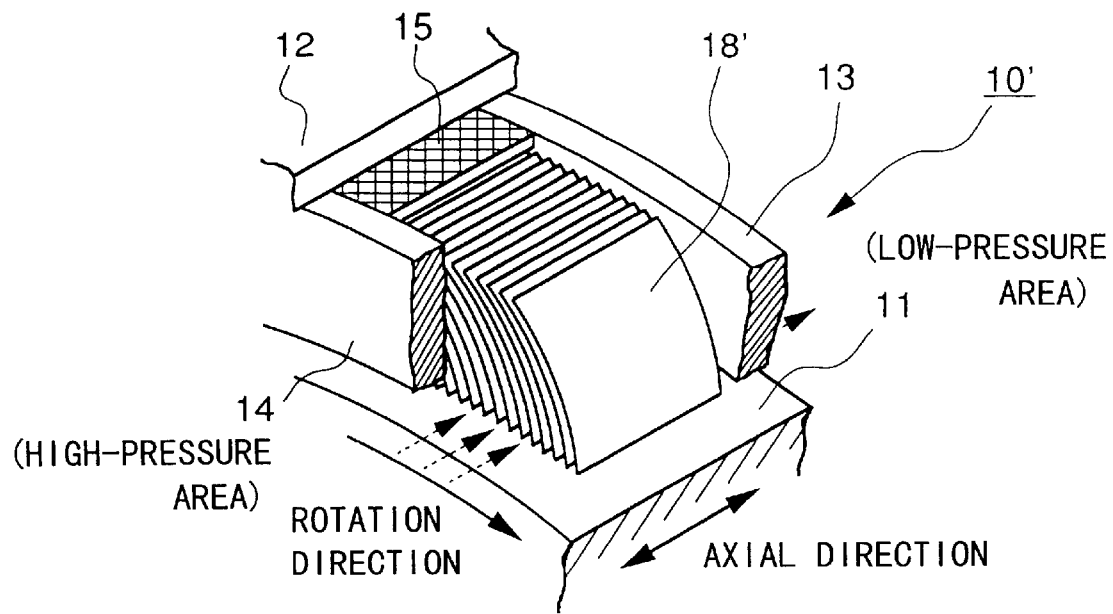
FIG. 14 is a perspective view showing the structure of the leaf seal as a variation of the fifth embodiment.

Also in the present embodiment, if the outer diameter of the rotation shaft 11 is relatively small, then in the leaf seal 10, uniformly-curved leaves 18' may be attached to the inner face of casing 11 so as to substantially fix the width of the gap between the leaves, as shown in FIG. 14.

Sixth embodiment

Below, the structure of the gas turbine as the sixth embodiment according to the present invention will be explained.

Figure 15:
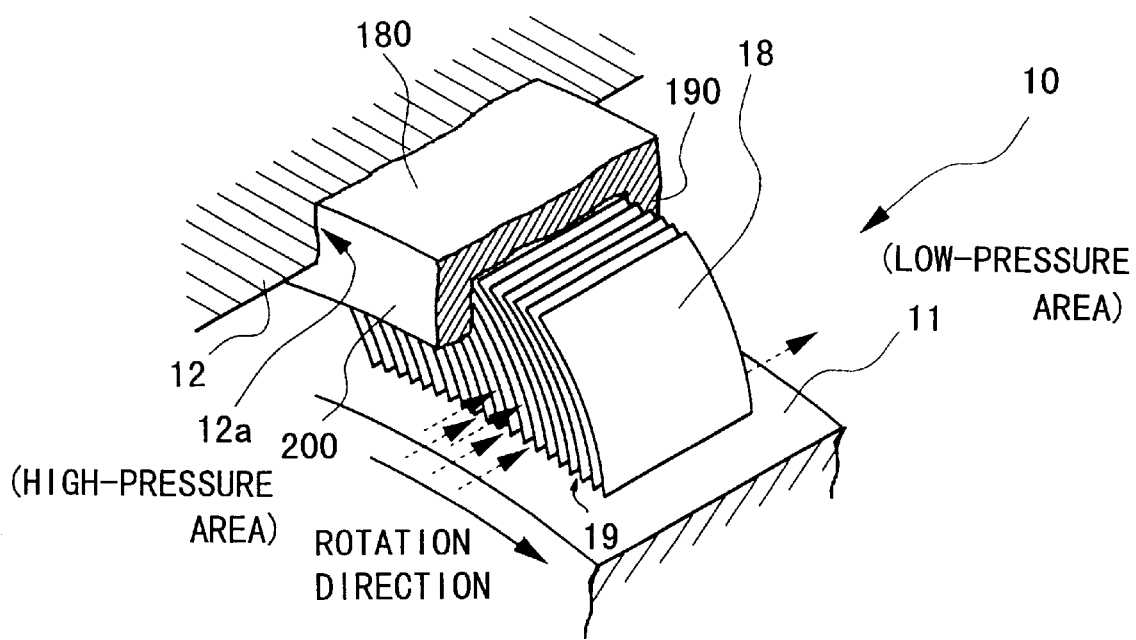
FIG. 15 is a perspective view showing the structure of the leaf seal as the sixth embodiment of the present invention.

FIG. 15 shows the structure of leaf seal 10 provided in the gas turbine of the present embodiment. As shown in the figure, the present structure comprises circular body (or member) 180, low-pressure side end plate 190, and high-pressure side end plate 200. The leaf seal 10 has a multi-layered structure similar to those in the above embodiments.

That is, at both sides of the leaves 18, high-pressure side end plate 200 is provided in the high-pressure area, while low-pressure side end plate 190 is provided in the low-pressure area. Each end plate functions as a guide plate with respect to the pressure acting direction, and these end plates and the circular body 180 are integrated, that is, formed as a single structural element.

As shown in FIG. 15, the circular body 180 is fit into groove 12a arranged in the inner surface of the casing 11 along the circumferential direction, and the top ends of leaves 18 slide on the outer-peripheral surface of the rotation shaft 11, so that the relevant space between the rotation shaft 11 and casing 11 is sealed. Here, the circular body 180 consists of a plurality of separate circular-arc portions 180a, and these portions 180a are arranged along the circumferential direction on the inner surface of casing 11 so as to make a circular body.

Figure 16A:
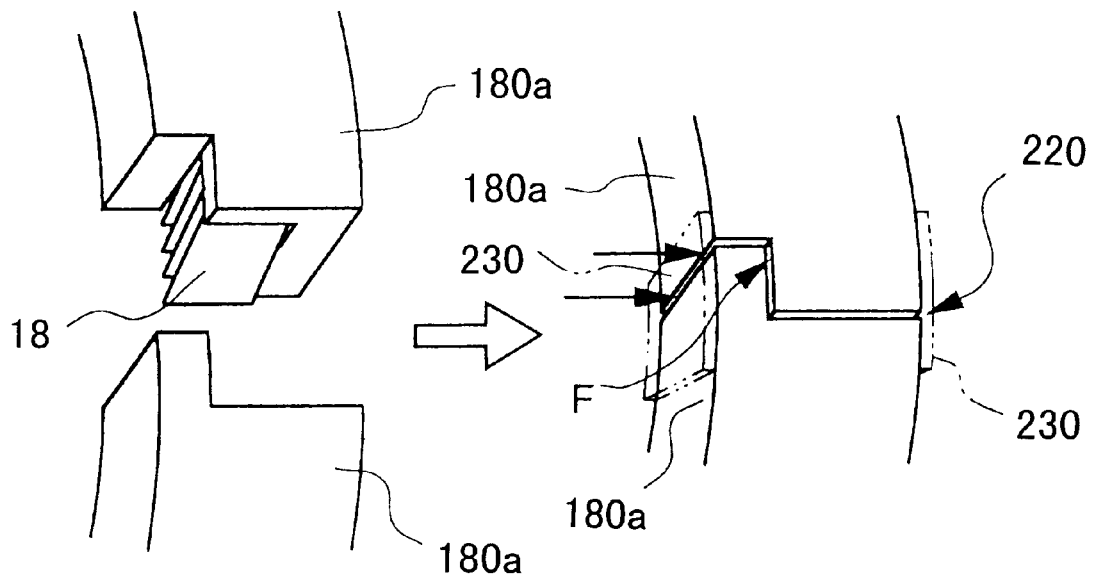
FIGS. 16A and 16B show examples of the junction between the separate circular-arc portions of circular body 180 of the sixth embodiment.

As shown in FIG. 16a, the ends of separate circular-arc portions 180a, which face each other, have steps so as to make a projecting portion in the circumferential direction, and division face F at junction 220 of adjacent portions 180a and 180a has an engaged form including a step in the circumferential direction. In addition, piece 230 for combining two portions 180a and 180a is attached to the junction 220, thereby realizing the circular body 180.

In the above sealing structure, the high-pressure combustion gas which reaches junction 220 between the separate portions 180a and 180a cannot pass through the junction because the division face F having a step blocks the gas. Therefore, it is possible to prevent the leakage of the combustion gas through the junction. In addition, the above engagement in the division face can prevent the separate circular-arc portions 180a and 180a from shifting in the axial direction; thus, the circular body 180 can be reinforced.

Figure 16B:
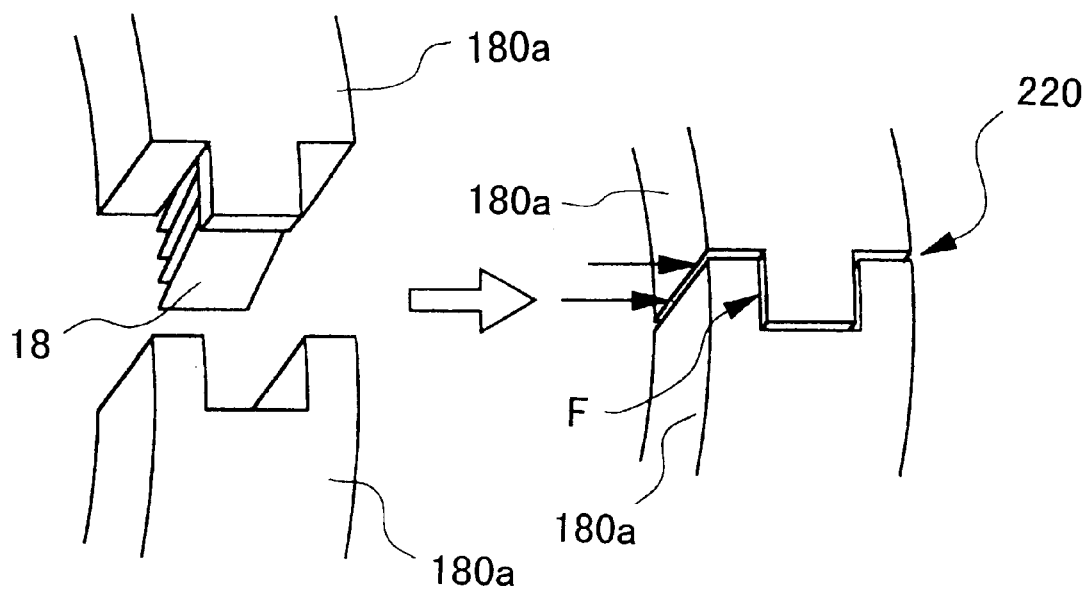

The shape of the division face at junction 220 may be concavoconvex as shown in FIG. 16B.

Figure 17:
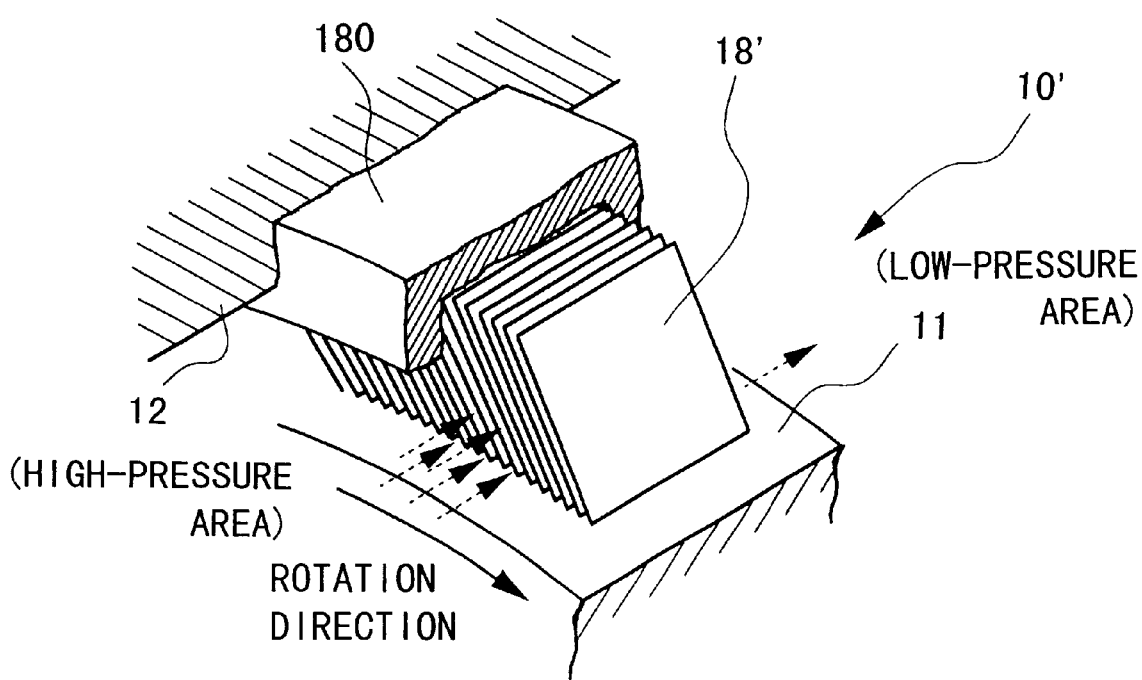
FIG. 17 is a perspective view showing the structure of the leaf seal as a variation of the sixth embodiment.

In the above structure, all leaves 18 are uniformly curved so as to fix each gap 19 between adjacent leaves. However, when the outer diameter of the rotation shaft 11 is relatively large, each gap between the leaves can be regarded approximately the same even though the leaves are not curved. Therefore, leaf seal 10' as shown in FIG. 17 may be employed, in which flat plate-shape leaves 18' may be provided on the inner surface of casing 12.

Seventh embodiment

Below, the structure of the gas turbine as the seventh embodiment according to the present invention will be explained.

Figure 18A:
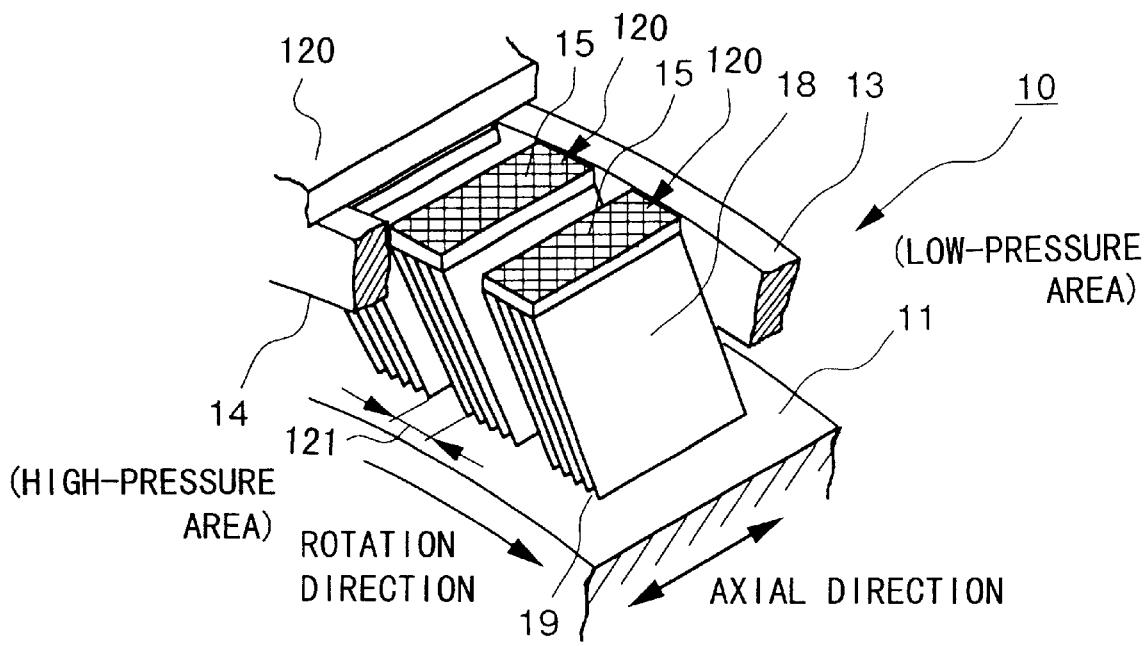
FIGS. 18A to 18B are diagrams showing the structure of the leaf seal as the seventh embodiment of the present invention.
Figure 18B:
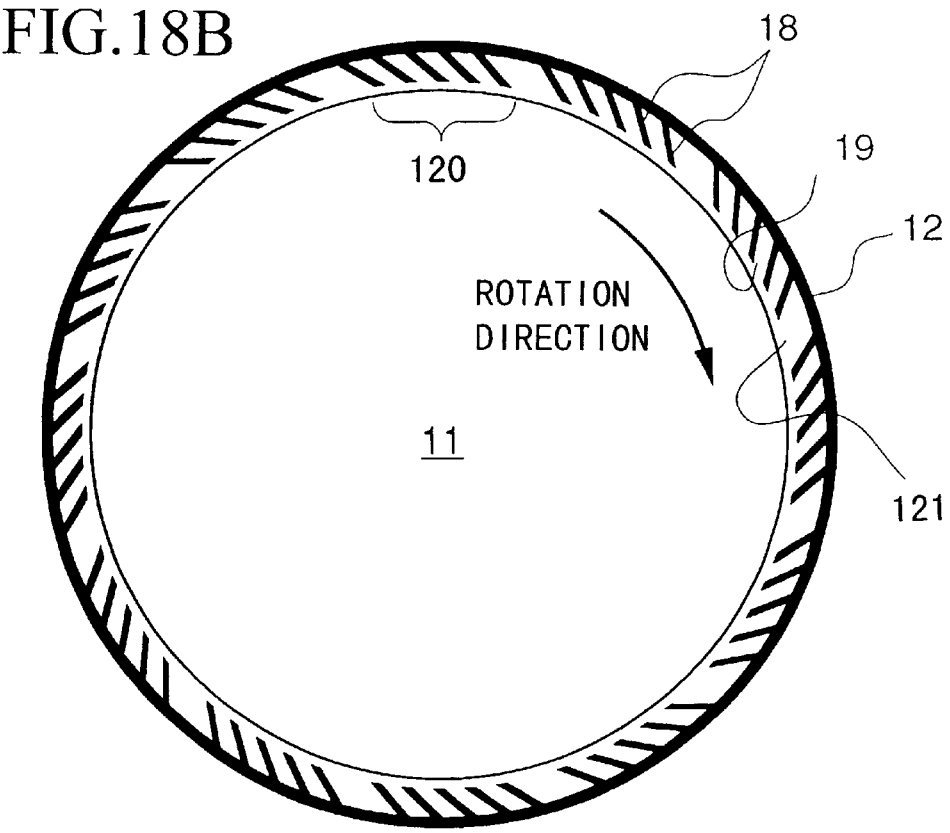

FIG. 18A shows the structure of leaf seal 10 provided in the gas turbine of the present embodiment, and FIG. 18B is a cross-sectional view showing the leaves 18 as constituents of the leaf seal.

As shown in the figures, also in the present embodiment, the leaves 18 are attached to casing 11 with an acute angle with respect to the peripheral surface of the rotation shaft 11. In addition to that, the leaves 18 are grouped into a plurality of unit segments, each unit segment 120 including, for example, five leaves, and space 121 is provided between adjacent unit segments 120.

According to the above space 121, when the top ends of the leaves 18 receive the dynamic pressure and are separated from the rotation shaft 11, the leaves belonging to a unit segment 120 are not much affected by the leaves belonging to adjacent unit segments; thus, the leaves are much easily separated from the rotation shaft 11. Accordingly, the contact between the leaves 18 and the rotation shaft 11 can be much more reliably prevented.

Figure 19A:
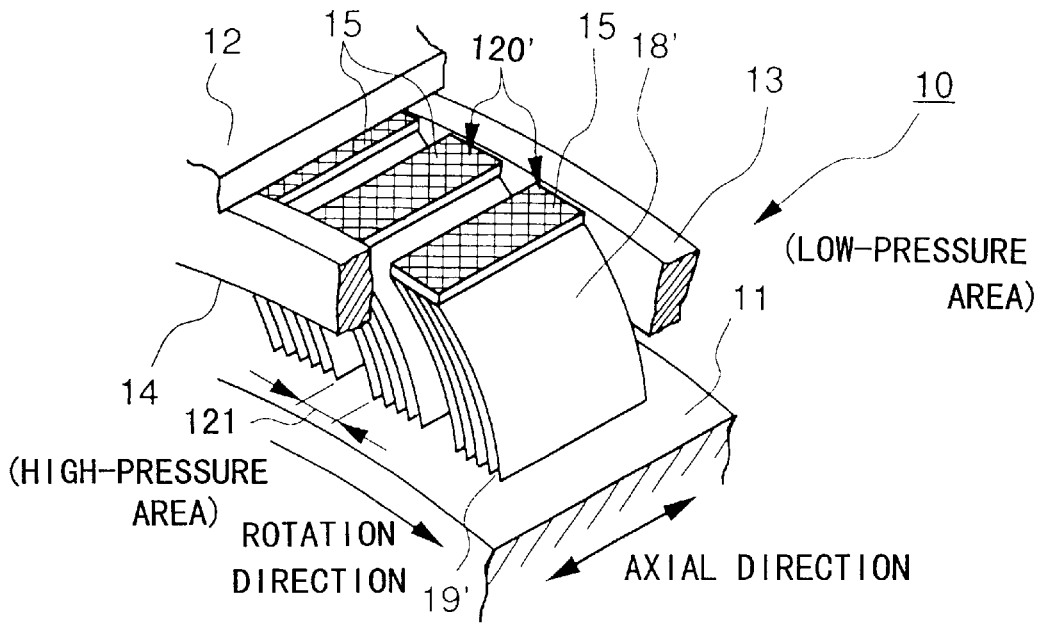
FIGS. 19A to 19B are diagrams showing the structure of the leaf seal as a variation of the seventh embodiment.
Figure 19B:
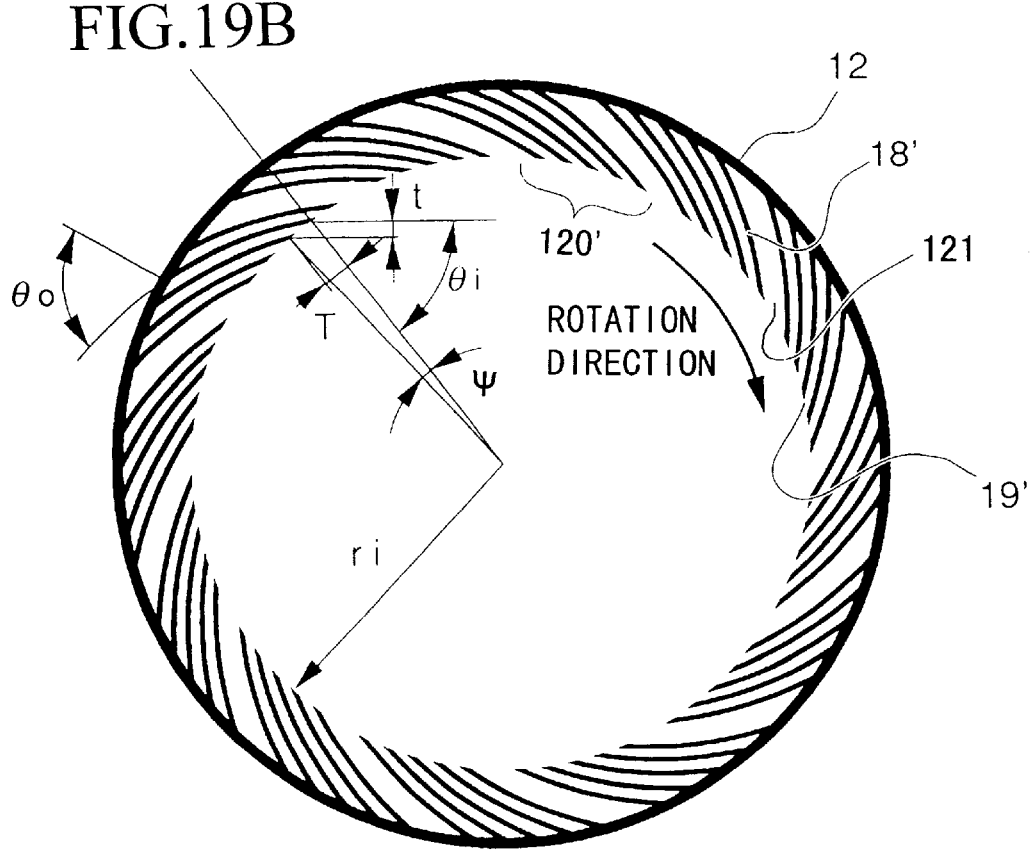

In the above structure, the seal diameter is sufficiently large; thus, even with flat plate-shape leaves 18, the width of each gap 9 is approximately fixed from the outer-diameter side to the inner-diameter side. However, if the seal diameter is relatively small, then as shown in a variation of FIGS. 19A and 19B, uniformly-curved leaves 18' may be used so that the width of gap 19' between the leaves can be substantially fixed even if the outer diameter of the rotation shaft 11 is relatively small.

In addition, the number of leaves 18 (or 18') per unit segment 120 (or 120') is not limited to five, but another number is possible and the number may be changed in the seal. For example, a first type of unit segment consisting of 5 leaves and a second type of unit segment consisting of 10 leaves may be alternately arranged.

Furthermore, the sizes of spaces 121 between unit segments 120 may be different depending on the design specification of the relevant shaft seal and gas turbine.

Eighth embodiment

Below, the structure of the gas turbine as the eighth embodiment according to the present invention will be explained.

Figure 20A:
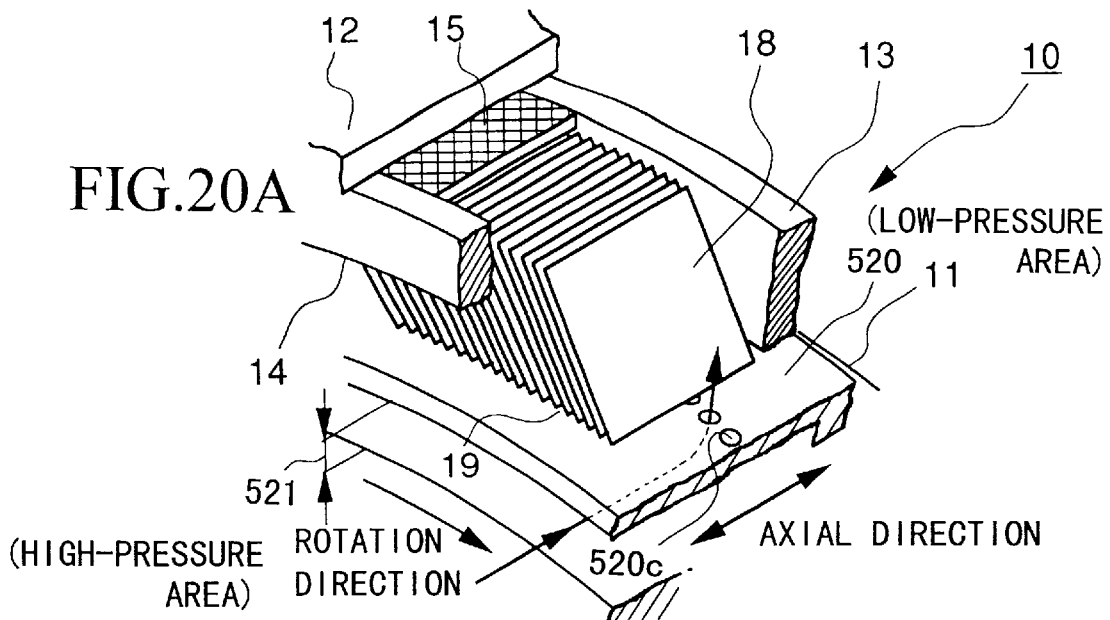
FIGS. 20A to 20C are diagrams showing the structure of the leaf seal as the eighth embodiment of the present invention.
Figure 20B:
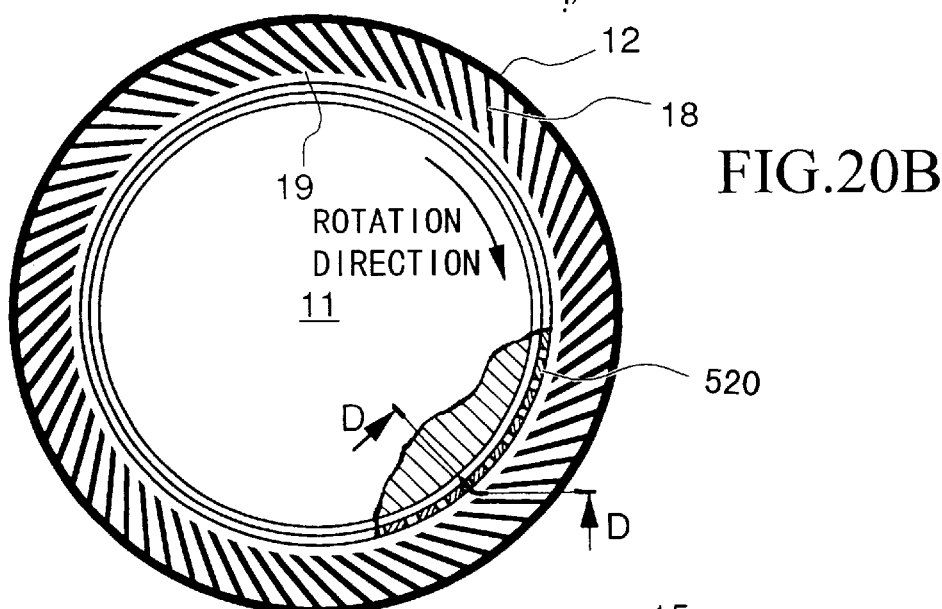
Figure 20C:
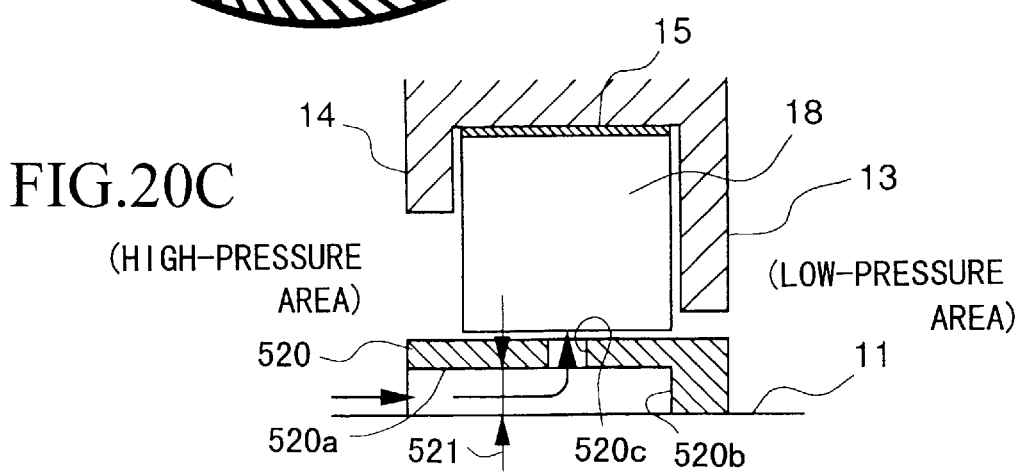

FIG. 20A shows the structure of leaf seal 10 provided in the gas turbine of the present embodiment, FIG. 20B is a cross-sectional view showing the leaves 18 as constituents of the leaf seal, and FIG. 20C is a cross-sectional view of face D—D of FIG. 20B.

As shown in the figures, in the present embodiment, fluid delivery unit 520 is provided in an area of the rotation shaft 11, where the leaves 18 slide. This unit 520 delivers fluid around the peripheral surface of the rotation shaft 11 to each leaf 18 by using the centrifugal force of the shaft. The unit 520 comprises ring portion 520a, arranged coaxially with the rotation shaft 11, having gap 521 between this ring portion and the peripheral surface of the shaft, and fixing portion 520b for fixing the ring portion 520a to the rotation shaft 11. The ring portion 520a has a plurality of (air) openings 520c which have a circular shape and are perpendicular to the axis of the rotation shaft 11.

While the rotation shaft 11 is not rotated (that is, stops), the top ends of leaves 18 receive a pre-load and contact the rotation shaft 11. When the rotation shaft 11 is rotated, the leaves 18 do not contact the rotation shaft 11 because the ends of the leaves 18 separate from the surface of the shaft due to the dynamic pressure generated by the rotation of the rotation shaft 11, and to the pressure of fluid delivered through the openings 520c of the fluid delivery unit 520.

According to the fluid delivery unit 520, the fluid around the rotation shaft 11 is delivered toward each leaf 18 by the centrifugal force of the shaft. Therefore, the top ends of leaves 18 are easily separated from the shaft, and it is possible to much more reliably prevent excessive heating and abrasion.

Figure 21:
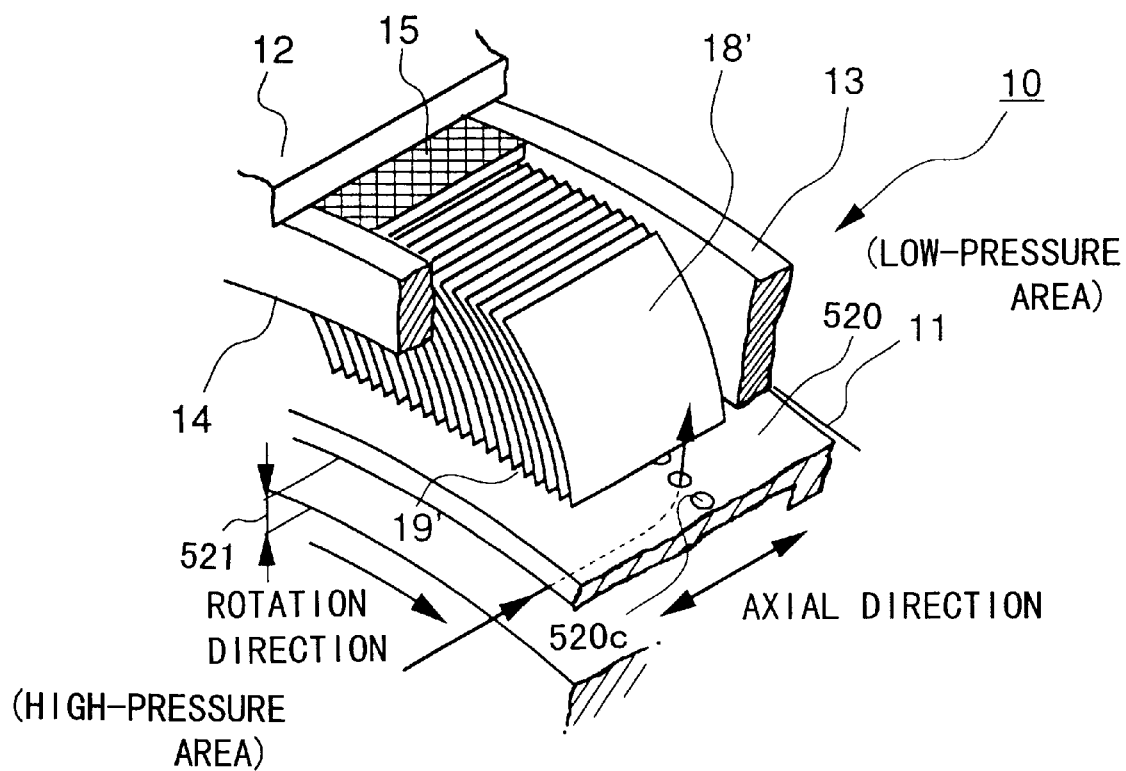
FIG. 21 is a perspective view showing the structure of the leaf seal as a variation of the eighth embodiment.

In the above structure, the seal diameter is sufficiently large; thus, even with flat plate-shape leaves 18, the width of each gap 19 is approximately fixed from the outer-diameter side to the inner-diameter side. However, when the seal diameter is relatively small, then as shown in FIG. 21, unifonnly-curved leaves 18' may be used so as to substantially fix the width of gap 19' between the leaves, even if the outer diameter of the rotation shaft 11 is relatively small.

Also in the above structure, the fluid delivery unit 520 has a ring shape arranged around the rotation shaft 11; however, the shape is not limited to this, and any variation is possible if it can deliver fluid around the rotation shaft 11 to each leaf 18 (or 18') so as to make the separation of the leaves easy. For example, it is possible to provide a hole, opening, or slit opened from the peripheral surface of the rotation shaft 11 towards the inner side along the radial direction of the shaft.

Also in the above structure, fluid in the high-pressure area is delivered via the fluid delivery unit 520; however, the unit 520 may be reversely attached so as to draw in fluid in the low-pressure area.

Also in the above structure, the openings 520c have a circular shape; however, the shape may be an ellipse, square, or the like. A slit or mesh structure may also be adopted.

Also in the above structure, the openings 520c are arranged perpendicular to the axis of the rotation shaft 11; however, this is not a limited condition, and the openings 520c may be inclined with respect to the peripheral surface of the ring portion 520a so as to much more effectively separate the top ends of leaves 18 (or 18') from the rotation shaft 11.

Also in the above structure, a single opening 520c is provided along the axial direction of the rotation shaft 11.

However, a plurality of openings having a smaller diameter may be provided so as to supply a uniform flow to the leaves 18 (or 18').

Additionally, according to the design specification of the shape of leaves 18 (or 18') or the like, the area of each air opening 120c may be changed for each position so as to adjust the fluid flow.

Ninth embodiment

Below, the structure of the gas turbine as the ninth embodiment according to the present invention will be explained.

Figure 22:
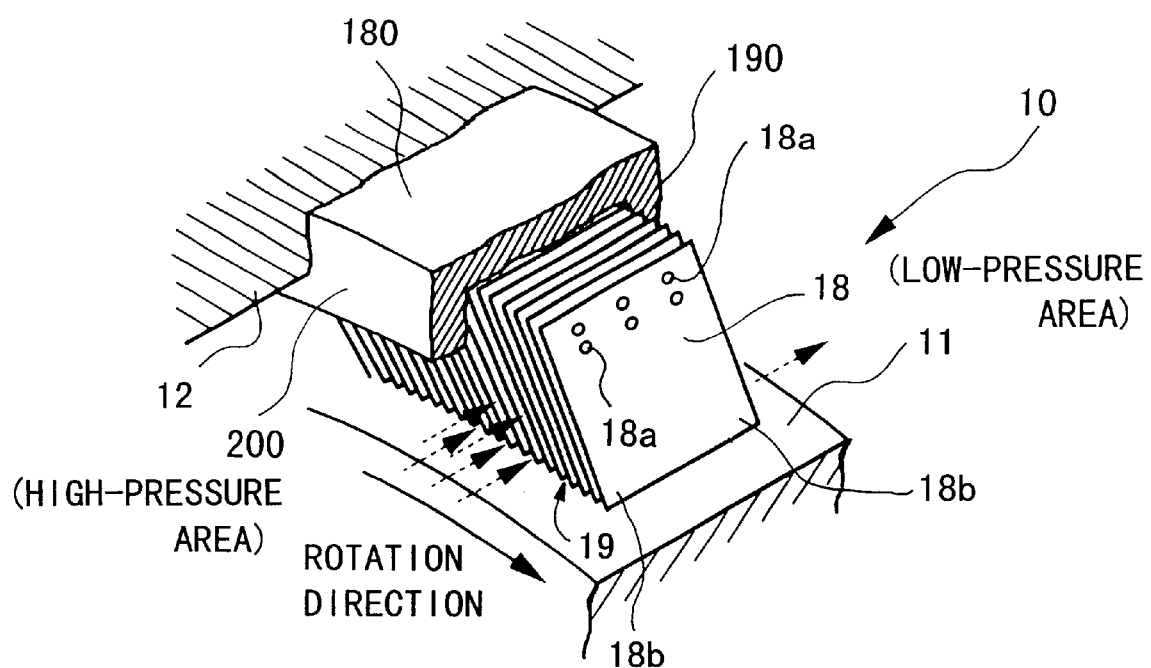
FIG. 22 is a perspective view showing the structure of the leaf seal as the ninth embodiment of the present invention.

FIG. 22 shows the structure of leaf seal 10 provided in the gas turbine of the present embodiment. The present embodiment has the same basic structure as that shown in FIG. 17, that is, the shape of each leaf 18 is substantially rectangular having specific width w in the axial direction of the rotation shaft 11. In the present embodiment, protruding portions 18a (corresponding to the gap making portion of the present invention) are provided on one face (the face being perpendicular to the thickness direction) of each leaf. The portions 18a are made to protrude by making a concavity in the corresponding portions from the other face.

FIGS. 23A to 23D show the structure of leaf 18 shown in FIG. 22. FIG. 23A is a plan view of the leaf, FIG. 23B is a cross-sectional view along arrow B—B in FIG. 23A, FIG. 23C is a plan view of a variation of the leaf in which the positions of the protruding portions are different from those shown in FIG. 23A, and FIG. 23D is a cross-sectional view along arrow C—C in FIG. 23C.

In the present embodiment, the dimensions of the leaf 18 (refer to FIG. 23A) are: w=5 to 10 mm, $L_1$=30 mm, $L_2$=5 mm, $s_1$=1 mm, and $s_2$=1.5 mm.

The thickness t of leaf 18 is determined so that the leaf has specific rigidity in the circumferential direction of the rotation shaft 11. In the present embodiment, width t is 0.1 mm.

The protrusion height h of the protruding portions 18a is suitably determined according to gap 19 (having a desired width) between leaves 18. In order to realize a high sealing capability by using leaf seal 10, it is preferable that the width of gap 19 is approximately 10 $\mu$m.

In the present embodiment, the protrusion height h of the protruding portions 18a is 10 $\mu$m. Such micro protruding portions 18a can be simultaneously made by precisely pressing the leaf 18. The present arrangement of the protruding portions 18a has three columns along the width of leaf 18 (that is, in the axial direction of the rotation shaft 11) and two rows in the longitudinal direction.

As indicated by dotted lines in FIGS. 23A and 23C, the protruding portions 18a are positioned in an area X defined from the base-end (i.e., outer-peripheral side) of the leaf to a position distant from the base end by a predetermined length in the longitudinal direction. This area X corresponds to the penetrated area in the brazing of the base end of leaf 18 to the circular body 180.

In addition, distance $s_3$ from the outer-peripheral side base end to the protruding portions 18a (positioned at the outer-peripheral side) is 1 mm (see the example indicated by reference numeral 18A), or 2 mm (see the example indicated by reference numeral 18B).

Additionally, distance $s_4$ between the protruding portions 18a in the longitudinal direction is 2 mm.

Figure 24:
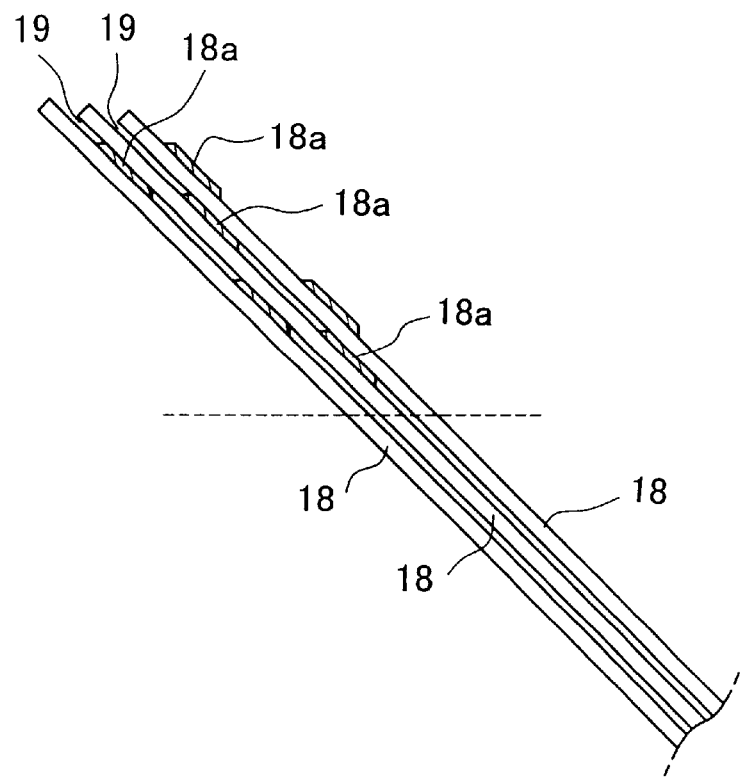
FIG. 24 is a side view showing the state in which the leaves as shown in FIGS. 23A and 23C are alternately layered.

As shown in FIG. 24, the above two types of leaves 18A and 18B are placed one upon another in a manner such that they contact each other via protruding portions 18a. Accordingly, micro gap 19 of 10 $\mu$m is easily and precisely provided between the leaves 18.

The width of gap 19 can be regarded as approximately the same from the outer-peripheral base-end side to the inner-peripheral top-end side because the seal diameter, that is, the diameter of the rotation shaft 11 is sufficiently large.

In FIG. 24, the protruding portions 18a are shaded so as to emphasize them.

Below, the process of manufacturing leaf seal 10 of the present embodiment will be explained.

First, a plate (i.e., material) is divided into a plurality of leaves 18 having the above-described specific size by using the photo-etching method. For example, if the diameter of the rotation shaft 11 is $\phi$350, then approximately 10,000 leaves 18 are made.

Next, protruding portions 18a functioning as the gap making portion are formed in each leaf 18 by using the precise pressing method, and then leaves 18 are attached to the circular body 180.

This circular body 180 consists of a plurality of separate circular-arc portions 31 (see FIG. 25), and these portions 31 are combined to each other along the circumferential direction so as to make a circular body.

The number of divided portions of the circular body 180 (i.e., the number of division) is determined dependent on the diameter of the rotation shaft 11. For example, if the diameter of the rotation shaft 11 is $\phi$350, then the number of divisions is 2, while if the diameter of the rotation shaft 11 is $\phi$1000, then the number of divisions is 6 (see FIG. 26).

The leaves 18 are fixed to the separate circular-arc portions 31 by welding the outer-peripheral side of the leaves to the portions 31.

Figure 25:
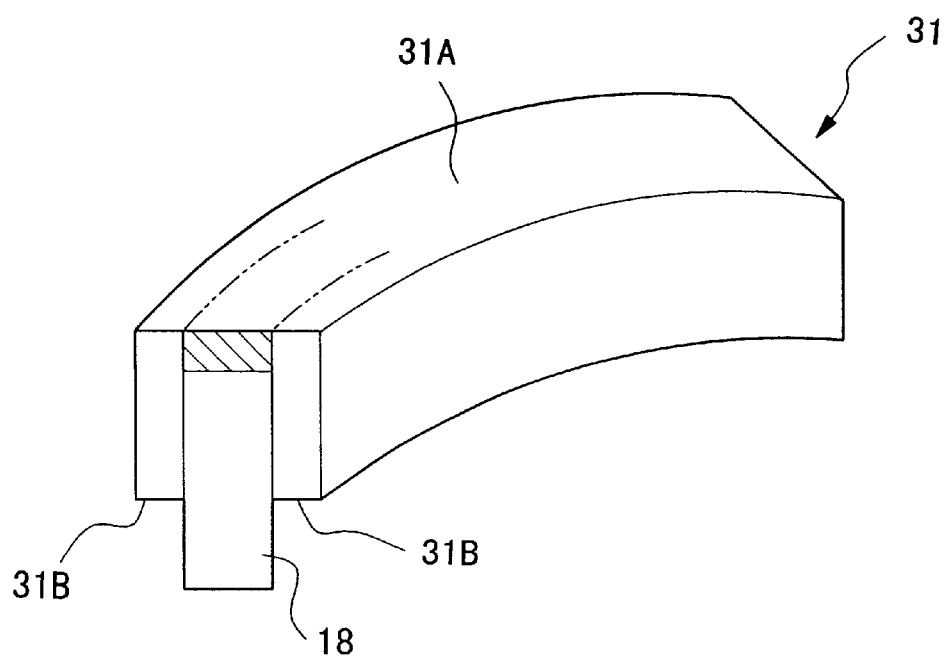
FIG. 25 is a perspective view showing the state in which the leaves are attached to a separate circular-arc portion as a constituent of the circular body shown in FIG. 22.

A known welding method using a laser, EBW, TIG, or the like can be used. In FIG. 25, the shaded parts indicate penetrated areas of the welding.

In the next step, a reference surface for attaching the separate circular-arc portions 31 to the casing 11 is produced by cutting-processing the outer-peripheral surface 31A and inner-peripheral surface 31B of the separate circular-arc portions 31 (to which the leaves 18 are attached).

Figure 26:
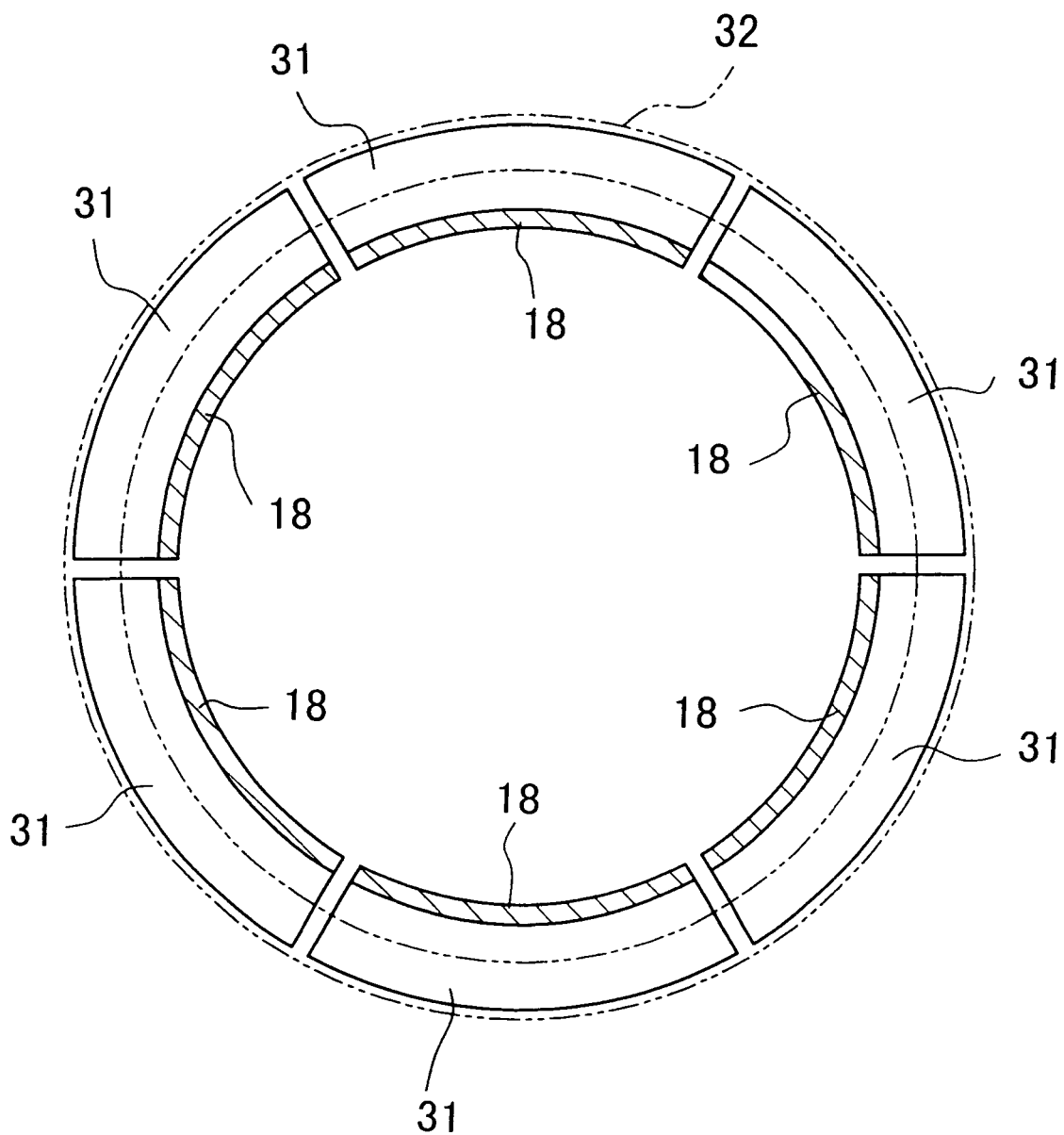
FIG. 26 is a plan view showing the state in which the separate circular-arc portions (shown in FIG. 25) are circularly arranged by using a jig before the top ends of the leaves are discharge-polished in the ninth embodiment.

After the above step, as shown in FIG. 26, the separate circular-arc portions 31 are attached to jig 32 so as to make a circular body.

Next, the top ends of leaves 18 are discharge-polished so as to have a specific seal diameter.

If the diameter of the rotation shaft 11 is $\phi$350, then the seal diameter is obtained by subtracting 0.5 mm from the diameter of the shaft.

The leaf seal is then attached to the gas turbine by detaching the separate circular-arc portions 31 from jig 32, and arranging them around the rotation shaft 11 and fixing the arranged portions to casing 12.

That is, in the present embodiment, protruding portions 18a are provided at some positions of each leaf 18 by using the precise pressing method, and the leaves 18 are made to contact with each other via these protruding portions 18a so as to make the gaps 19 between the leaves 18. Therefore, it is possible to easily and precisely make the gaps 19 on which the sealing capability depends.

In addition, the protruding portions 18a (as the gap making portion) are made by deforming some portions of each leaf 18; thus, the number of necessary constituents of the seal is not increased.

As explained above, according to the present embodiment, a high sealing capability can be obtained, and the productivity can also be improved because the leaves 18 can be attached to the circular body 180 very easily. Furthermore, no strict production control is necessary, thereby reducing the manufacturing cost.

Figure 27A:
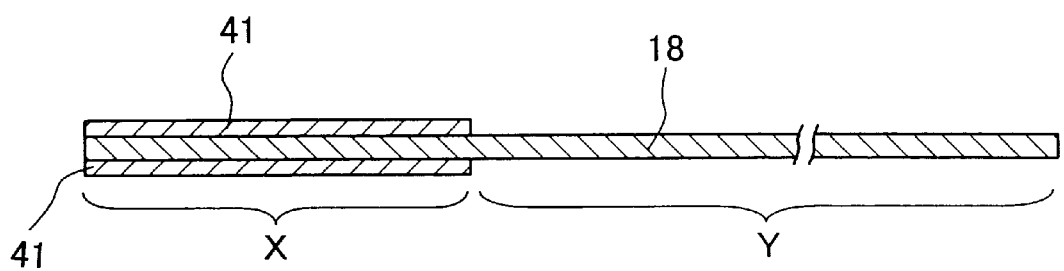
FIG. 27A is a cross-sectional view showing a distinctive portion of the leaf of the leaf seal as a variation of the ninth embodiment.

A variation of the present embodiment will be explained with reference to FIG. 27A.

In the above embodiment, protruding portions 18a produced using the precise pressing method are employed in each leaf 18 as the gap making portion. In this variation, plated layer 41 produced by using the hot dipping method, also functioning as the gap making portion, is provided in a part of leaf 18.

That is, the penetrated area X of the welding is, for example, Cr-plated so as to form a step of plated layer 41, functioning as the gap making portion, on the surface of leaf 18.

For example, in order to make a gap 19 of 10 µm between leaves 18, a plated layer 41 of a thickness of 5 µm is formed on either side (i.e., front and back) of leaf 18.

Similar to the above embodiment, this variation also can reliably fix the (predetermined) width of gap 19 between leaves 18 from the outer-peripheral side to the inner-peripheral side by making the leaves contact each other via plated layers 41.

The thickness of plated layer 41 can be determined to micrometer order; thus, gaps between leaves 18 can be precisely provided over the relevant circumference of the rotation shaft 11, thereby realizing leaf seal 10 and a gas turbine employing the same, which can reliably have and maintain a high sealing capability.

The gap making portion of the present invention is not limited to the above protruding portions 18a and plated layer 41, but a spacer integrally fixed to leaf 18 may be used, or a thick portion may be provided in the leaf 18.

Figure 27B:
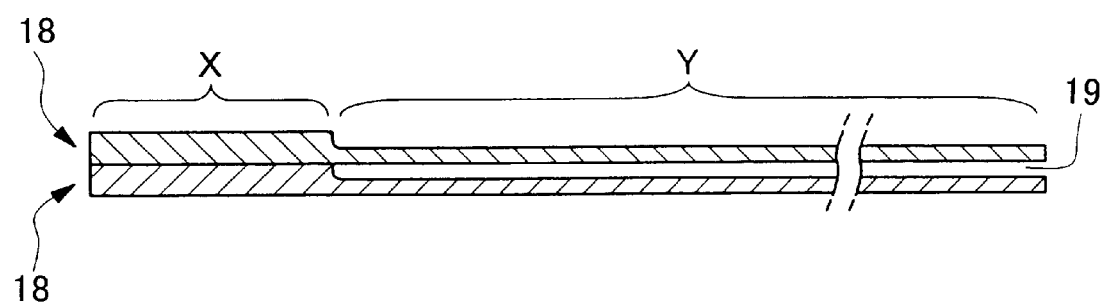
FIG. 27B is a cross-sectional view showing a distinctive portion of the leaf of the leaf seal as another variation.

As shown in FIG. 27B, area Y (the other area than area X) in leaf 18 may be etched so as to make a step between the non-etched area X and etched area Y.

In this case, each gap 19 between leaves 18 can be precisely provided, and the sealing capability can be much more improved.

The shape of leaf 18 is not limited to a rectangular and flat plate shape, but a plate having a curved section like an arc may be used.

According to the above structure, the width of each gap 19 between leaves 18 can be precisely fixed from the outer-peripheral base-end side to the top-end side.

In addition, each leaf 18 has specific rigidity, determined depending on the thickness of the leaf, in the circumferential direction of the rotation shaft 11. Therefore, with rectangular leaves as shown in FIG. 22, the corner 18b at the top end side of leaf 18 may damage the outer-peripheral surface of the rotation shaft 11, due to the relative sliding and displacement motion between the leaves 18 and the rotation shaft 11.

Figure 28:
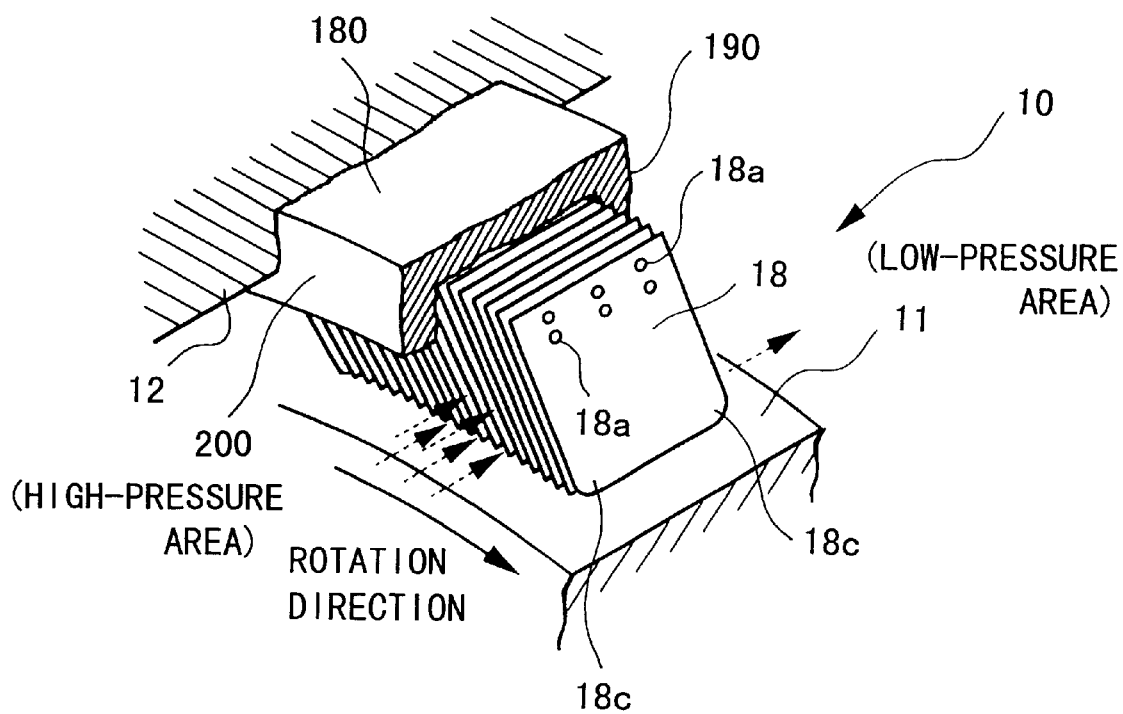
FIG. 28 is a perspective view showing the structure of the leaf seal as a further variation of the ninth embodiment.

In order to prevent such damage to the rotation shaft 11, as shown in FIG. 28, arc-shaped top-end side (i.e., outer-peripheral side) edge 18c (e.g., R=0.5 mm) is preferably provided by chamfering the relevant corner, or by another method.

According to the above-explained arc-shaped edge 18c, it is possible to prevent a (keen) point of the top end of leaf 18 from contacting the outer-peripheral surface of the rotation shaft 11, so that the pressure applied by leaves 18 to the rotation shaft 11 is reduced.

Therefore, damage to the rotation shaft 11, observed in a sealing structure employing leaves having a corner edge at the top-end side, can be efficiently prevented, thereby increasing the lifetime of the rotation shaft 11.

Tenth embodiment

Below, the structure of the gas turbine as the tenth embodiment according to the present invention will be explained.

Figure 29:
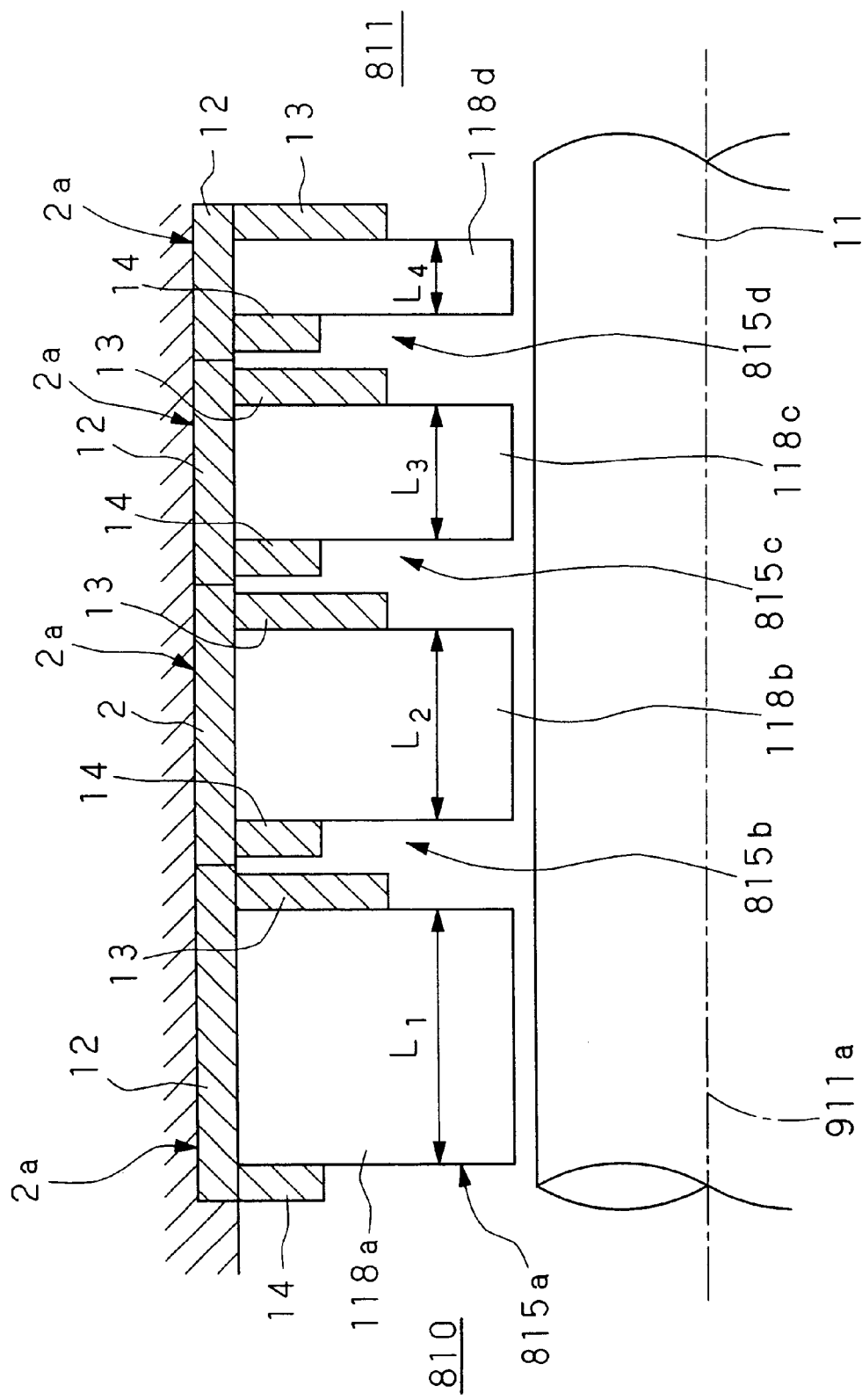
FIG. 29 is a diagram showing the structure of the shaft seal apparatus as the tenth embodiment of the present invention, along the axial direction of the rotation shaft.
Figure 30:
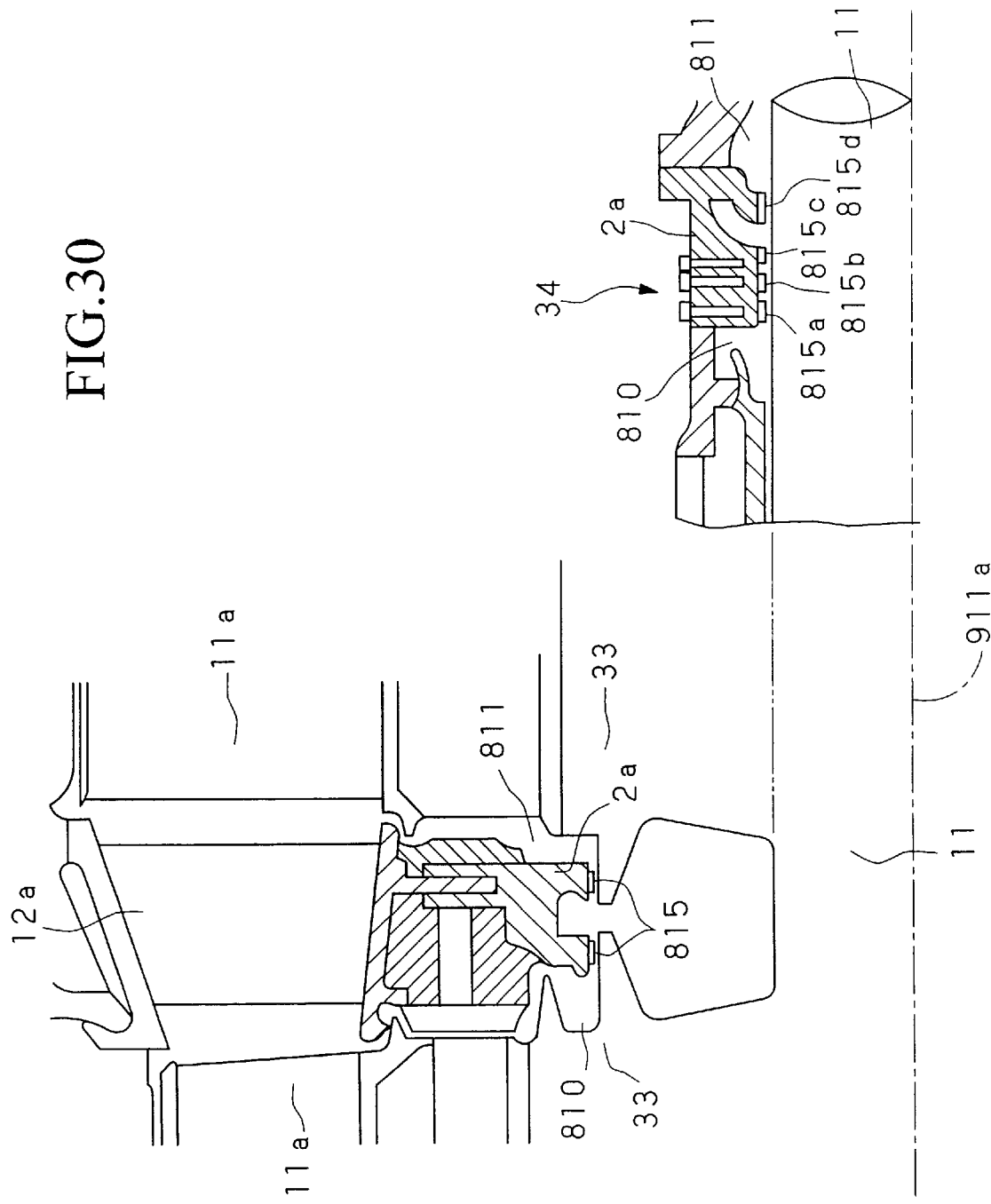
FIG. 30 is a diagram showing the structure of a distinctive portion around the rotation shaft of the gas turbine which employs the above shaft seal apparatus.

FIG. 29 is a diagram showing the structure of a shaft seal apparatus of the present embodiment along the axis of the rotation shaft, and FIG. 30 is a diagram showing a distinctive portion (around the rotation shaft) of the gas turbine employing the above shaft seal apparatus.

In the present gas turbine (see FIG. 30), reference numeral 11 indicates a rotation shaft (i.e., rotor whose rotation axis is indicated by reference numeral 911a), and reference numeral 11a indicates moving blades attached in the outer-peripheral area of rotor disk 33 of the rotation shaft 11. Reference numeral 12a indicates a stationary blade. The stationary blade is provided at the previous stage of each moving blade 11a.

In the present embodiment, shaft seals are provided at rotor end 34, inner-peripheral portions of stationary blades 12a, and the like, and reference numeral 2a indicates a support ring, reference numeral 815 indicates a leaf seal (or a leaf-seal ring) provided between the stationary blade 12a and the rotor disk 33 inside the stationary blade, and reference numerals 815a, 815b, 815c, and 815d indicate four-stage leaf seals provided at rotor end 34.

Reference numeral 810 indicates a high-pressure chamber at the high-pressure side of the leaf seals 815a to 815d, while reference numeral 811 indicates a low-pressure chamber.

Figure 31:
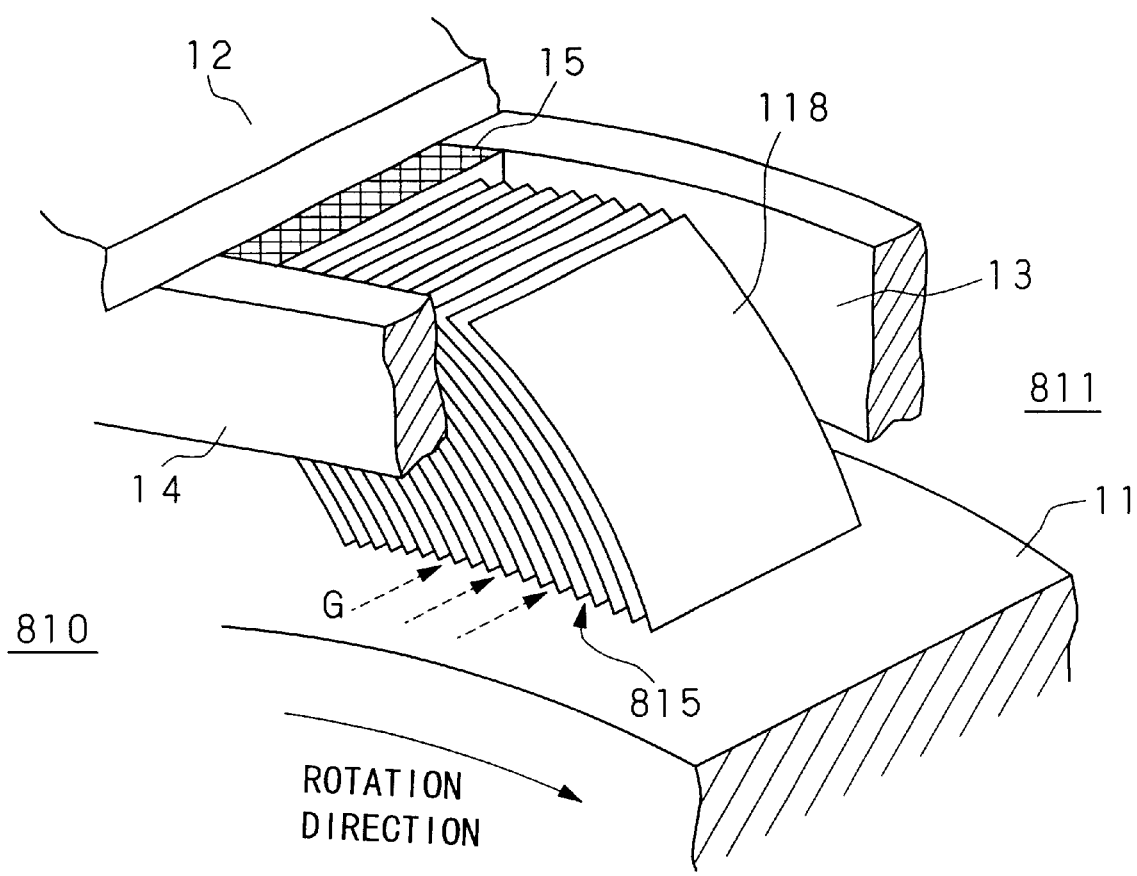
FIG. 31 is a perspective view showing the structure of the leaf seal as the tenth embodiment of the present invention.

As shown in FIG. 31, each leaf seal has the same basic structure as those in the previous embodiments, that is, leaves 118 are multi-layered in the circumferential direction of the rotation shaft 11. The leaves 118 are attached at an acute angle with respect to the rotation direction along the peripheral surface of the rotation shaft 11.

In this tenth embodiment, the above leaf seal 815 is attached as follows.

In FIG. 29, reference numeral 810 indicates a high-pressure chamber, and reference numeral 811 indicates a low-pressure chamber, and four-stage leaf seals 815a, 815b, 815c, and 815d are attached between the high-pressure chamber 810 and the low-pressure chamber 811.

Similar to the structure shown in FIG. 31, in the four-stage leaf seals, leaves 118a, leaves 118b, leaves 118c, and leaves 118d having different widths in the axial direction are respectively attached to support ring 2a which consists of high-pressure side end plate 14, low-pressure side end plate 13, and casing 12. More specifically, the first-stage leaf seal 815a at the high-pressure chamber 810 side comprises leaves 118a having a width $L_1$ (in the axial direction), the second-stage leaf seal 815b comprises leaves 118b having a width $L_2$, the third-stage leaf seal 815c comprises leaves 118c having a width $L_3$, and the fourth-stage leaf seal 815d comprises leaves 118d having a width $L_4$.

The width L (in the axial direction) of each leaf 118a to 118d is defined by the following formula (3):

$$L = k (P_i^2 - P_{i+1}^2) G \qquad (3)$$

where G indicates the weight flow of leakage of fluid (i.e., gas) at each stage, $P_i$ indicates the pressure at the high-pressure side of each stage, and $P_{i+1}$ indicates the pressure at the low-pressure side of each stage, and k is a coefficient.

Figure 32:
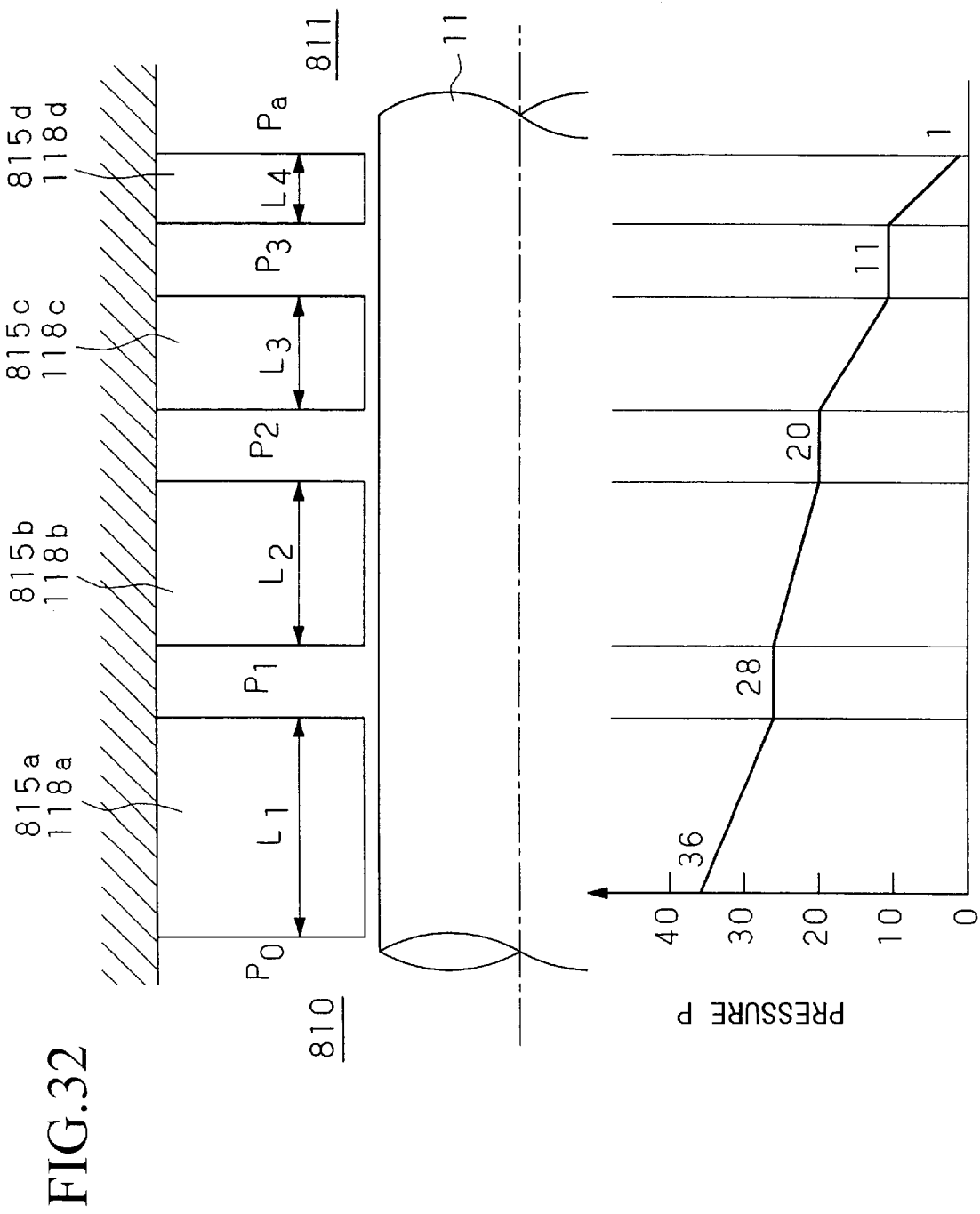
FIG. 32 is a diagram for explaining the function in the tenth embodiment.

Therefore, as shown in FIG. 32, if the pressure of the high-pressure chamber 810 is $P_0$ (=36 kg/cm²f, in this example), the pressure of the low-pressure chamber 811 is $P_a$ (=1 kg/cm²f, in this example), and the pressure values of each point between two stages are $P_1$(=28 kg/cm²f), $P_2$(=20 kg/cm²f), and $P_3$(=11 kg/cm²f), then these pressure values and weight flow G of leakage are input into the above formula (3) so as to determine the width of each of leaves 118a to 118d of the leaf seals 815a to 815d.

Accordingly, the steps of the leaf seals (here, 815a to 815d) and each width $L_1$, $L_2$, $L_3$, and $L_4$ of leaves 18a to 18d, necessary for reducing the pressure from $P_0$ (in high-pressure chamber 810) to $P_a$ (in low-pressure chamber 811), can be determined.

That is, in this embodiment, the widths $L_1$, $L_2$, $L_3$, and $L_4$ of leaves 118a, 118b, 118c, and 118d as constituents of the leaf seals 815a to 815d of each step are determined in a manner such that the first step at the high-pressure chamber 810 side has the maximum value, and the value gradually decreases and the fourth step has the minimum value (i.e., $L_1 > L_2 > L_3 > L_4$), so as to reduce the pressure from $P_0$ (=36 kg/cm²f) in the high-pressure chamber 810 to the desired pressure $P_a$ (=1 kg/cm²f: the atmospheric pressure) in the low-pressure chamber 811.

Therefore, in the present embodiment, multi-step leaf seals are arranged and the widths (in the axial direction) of leaves 118a to 118d of each step are determined based on the formula (3) which indicates the relationship between the differential pressure ($P_i^2 - P_{i+1}^2$) of each step and weight flow of leakage G of fluid, thereby realizing a minimum leakage of fluid (i.e., gas) to the low-pressure chamber 811 side.

Any number of leaf seals may be used (i.e., a plurality of leaf seals are used), and the widths of each step may be the same or different (that is, the above condition $L_1 > L_2 > L_3 > L_4$ is not always necessary).

Eleventh embodiment

Below, the structure of the leaf seal as the eleventh embodiment according to the present invention will be explained.

Figure 33:
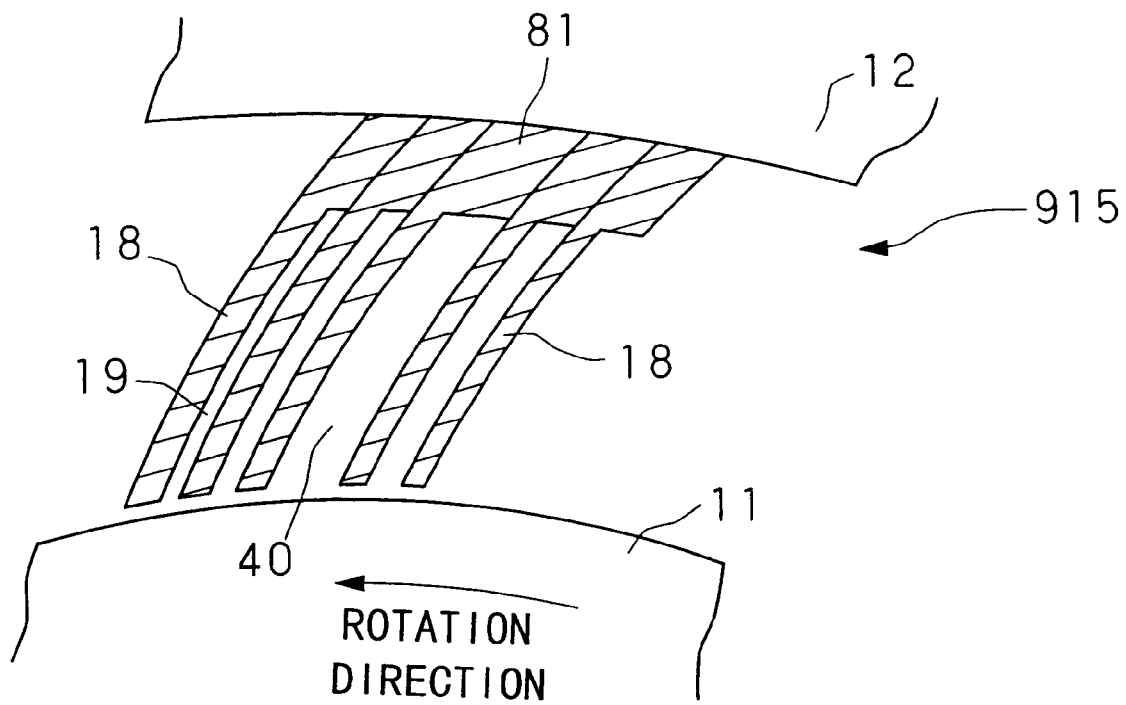
FIG. 33 is a diagram showing the structure of a distinctive portion of the leaf seal as the eleventh embodiment of the present invention.

FIG. 33 is a diagram showing the structure of a distinctive portion of leaf seal 915 of the present embodiment.

In this embodiment, escape passage 40 is provided in some leaves 18 (approximately 6 leaves are preferable) of leaf seal 915 in the circumferential direction. This escape passage is produced by removing a freely-bending portion of the target leaves so that in the circumferential direction, the widths of the relevant gaps (i.e., the escape passages) generated by this removing process are larger than the other gaps.

In this case, it is preferable that the width of escape passage 40 is approximately 0.1 mm while the width of gaps 19 between the leaves 18 is generally 0.01 mm or the like.

According to the present embodiment, when the differential pressure between the high-pressure side and the low-pressure side is increasing in leaf seal 915, a part of the pressure at the high-pressure side escapes and is relieved through the escape passages 40 provided in a plurality of areas of the leaf seal in the circumferential direction, thereby preventing the differential pressure from increasing and also preventing damage to leaves 18 due to the increase of the differential pressure.

Twelfth embodiment

Below, the structure of the leaf seal as the twelfth embodiment according to the present invention will be explained.

Figure 34:
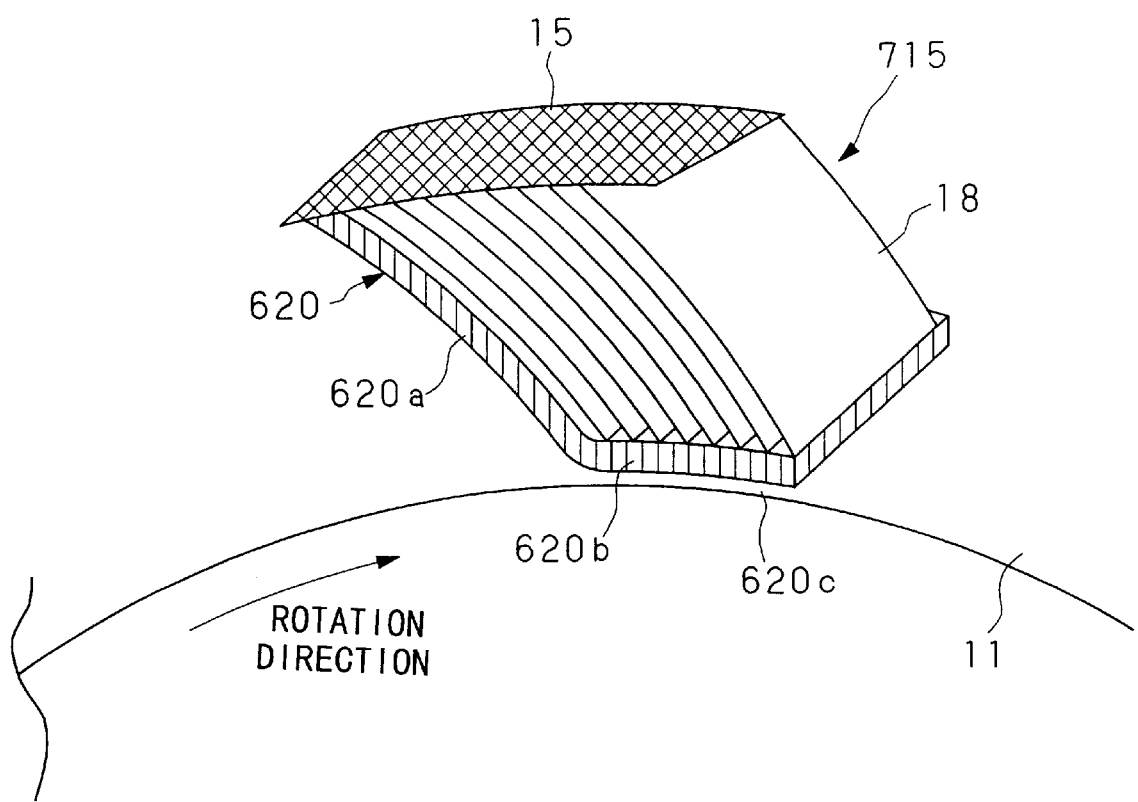
FIG. 34 is a diagram showing the structure of a distinctive portion of the leaf seal as the twelfth embodiment of the present invention.

FIG. 34 is a diagram showing the structure of a distinctive portion of leaf seal 715 of the present embodiment.

In this embodiment, leaves 18 as the constituents of leaf seal 715 are grouped into blocks (each called a "unit segment", preferably including 50 to 100 leaves), and the leaves 18 of each block are attached to main leaf 620 whose thickness is sufficiently larger than that of the leaf 18. The blocks are arranged along the circumferential direction so that they are adjacent to each other. The main leaf 620 comprises leaf portion 620a having a front-face shape similar to that of leaf 18, and skirt portion 620b integrally connected with the inner-peripheral side of the leaf portion 620a. A small gap 620c is provided between the skirt portion 620b and the outer-peripheral surface of the rotation shaft 11.

The outer-peripheral side of each block is brazed to a casing (not shown, and reference numeral 15 indicates a brazed portion).

According to the present embodiment, a plurality of leaves 18 is supported as a single block by using main leaf 620, so that the rigidity of leaf seal 715 can be improved. Therefore, even when the differential pressure between the high-pressure and low-pressure sides is large or when the torsional load acts on leaves 18, the sealing of fluid can be realized using the leaves without damage.

According to the above-described differential pressure and dynamic pressure, the inner-peripheral side of the skirt portion 620b of main leaf 620 and the outer-peripheral surface of the rotation shaft 11 can be in a non-contact state.

In the above-explained embodiments, the shaft seal (apparatus) is generally attached to the stationary blades of the rotation shaft, but embodiments of the present invention are not limited to this arrangement. For example, as shown in FIG. 35 which corresponds to FIG. 2, the shaft seal according to the present invention may be provided at the discharge portion of the compressor (i.e., leaf seal 1010), or at the intermediate shaft (i.e., leaf seal 1020).

Figure 35:
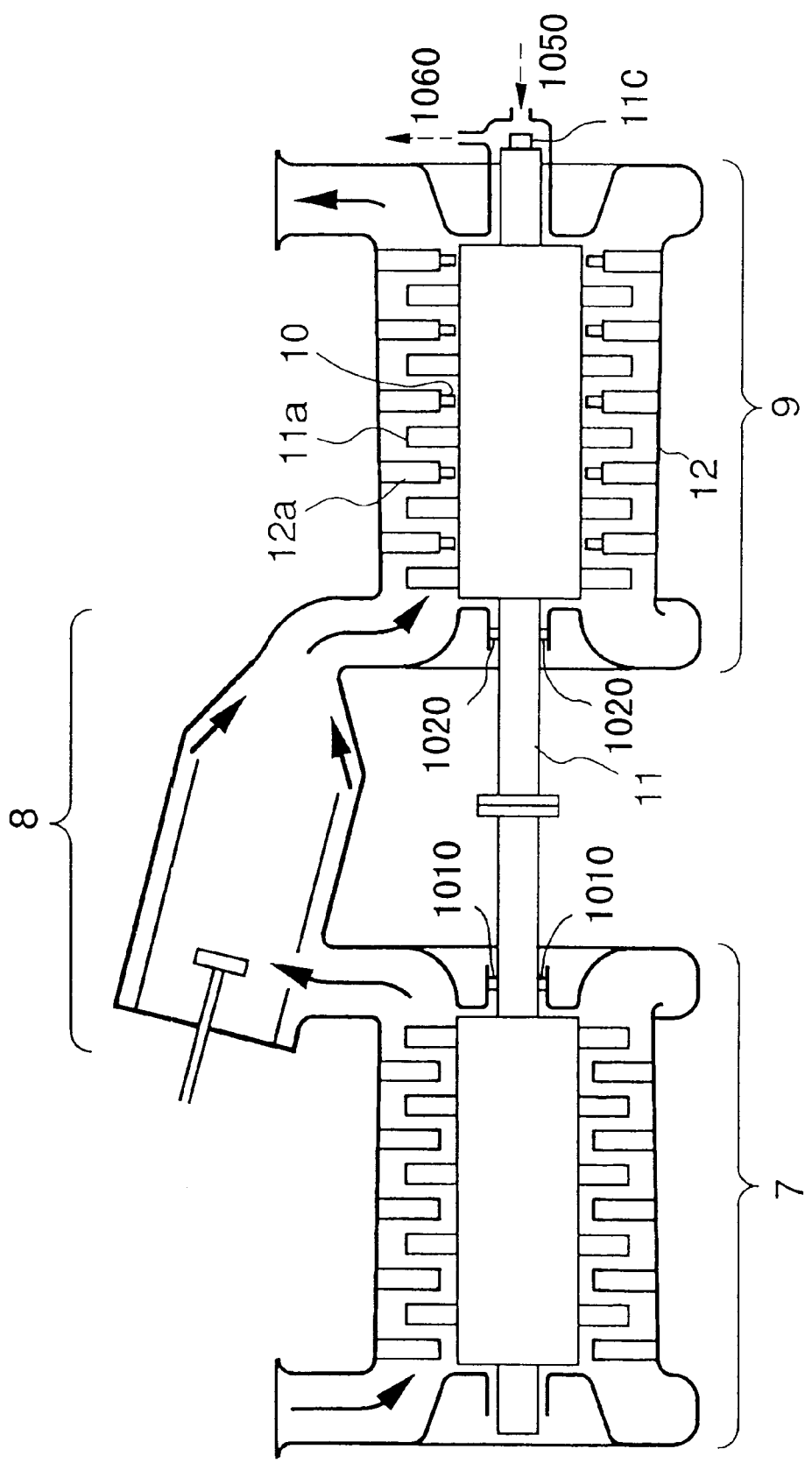
FIG. 35 is a diagram showing the general structure of a gas turbine employing a shaft seal according to the present invention.

The rotation shaft 11 in FIG. 35 has a double-pipe structure in detail. The cooling steam supplied from the steam inlet 1050 to inner pipe 11C flows through the passage between the moving blades of the rotation shaft 11 and cools the moving blades, and is discharged from the outlet 1060. The enlarged cross-sectional view of the relevant portion is shown in FIG. 36A.

Figure 36A:
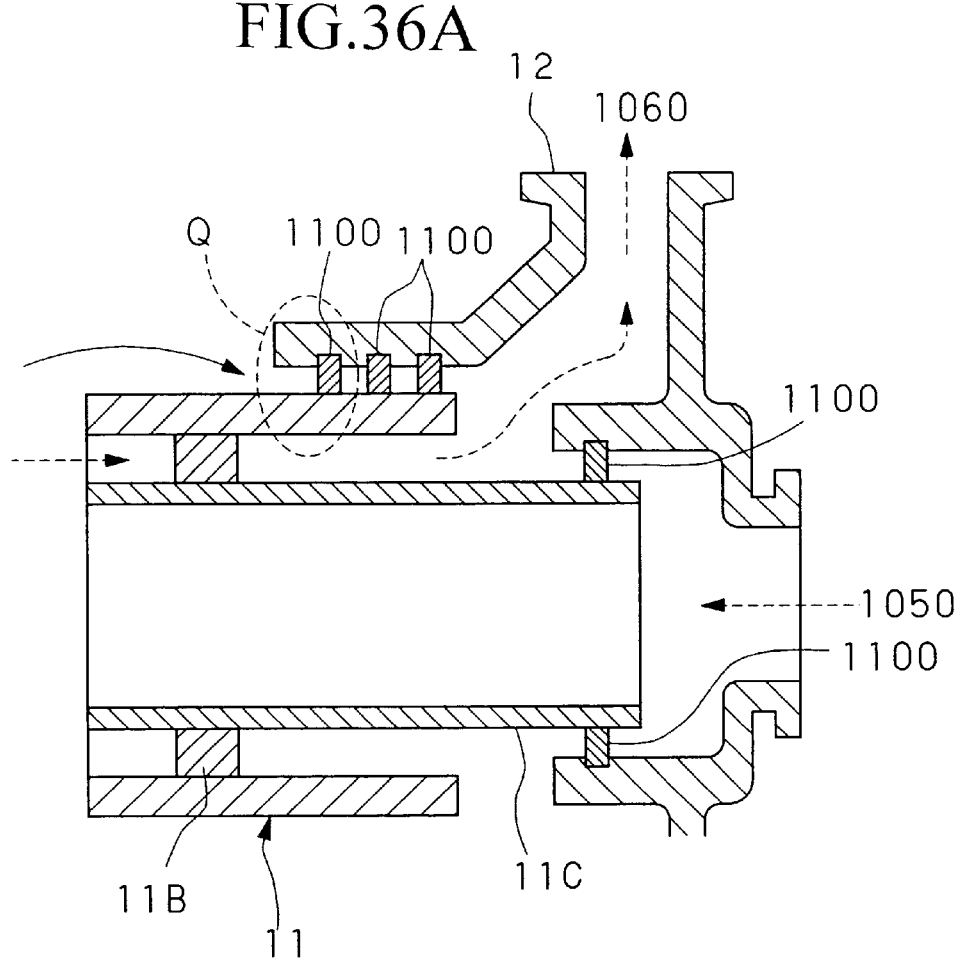
FIG. 36A is an enlarged cross-sectional view showing an area around the steam inlet and outlet in FIG. 35.

In FIG. 36A, rib 11B is a member for coupling the rotation shaft 11 and inner pipe 11C. In this figure, the shaft seals according to the present invention are provided at positions indicated by reference numerals 100 (here, 5 positions).

Figure 36B:
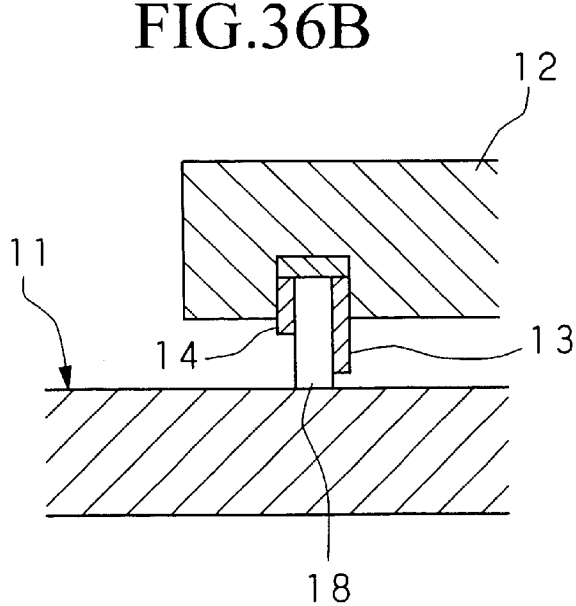
FIG. 36B is an enlarged cross-sectional view showing the area surrounded by dotted circle Q in FIG. 36A.
Figure 37A:
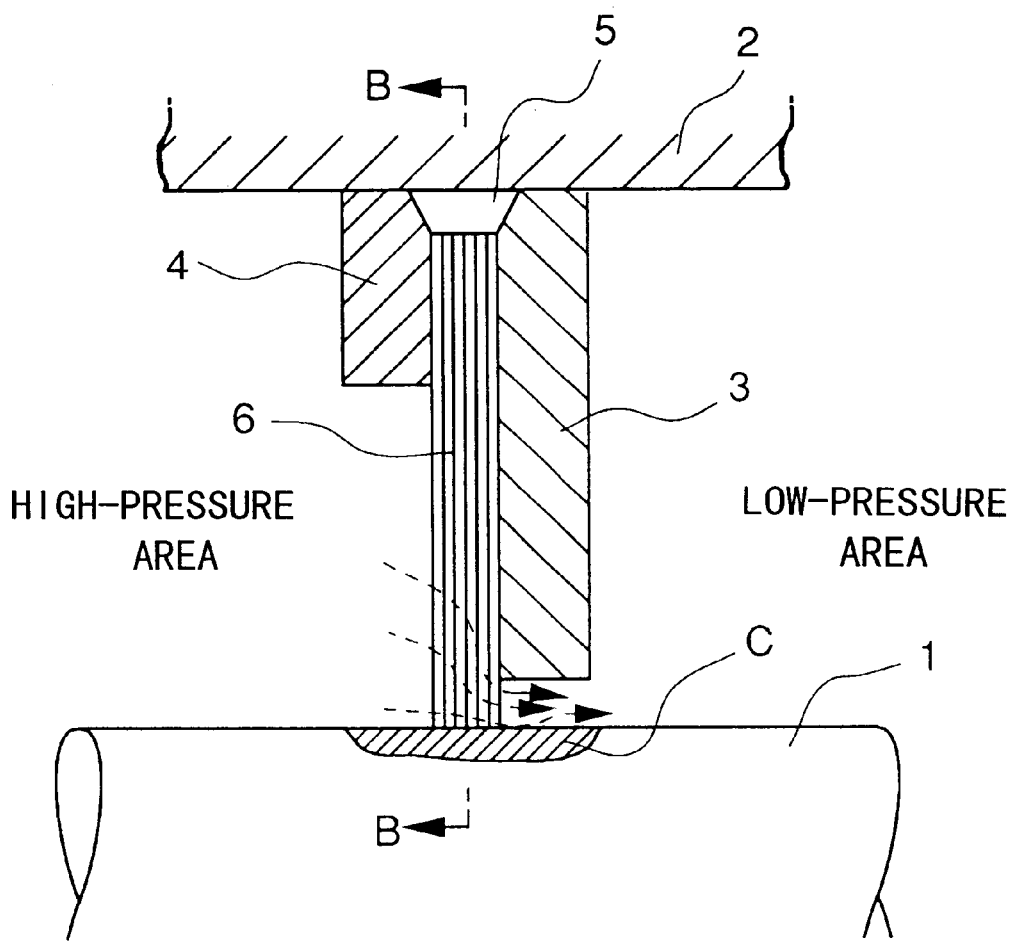
FIGS. 37A and 37B are diagrams showing a conventional brush seal.
Figure 37B:
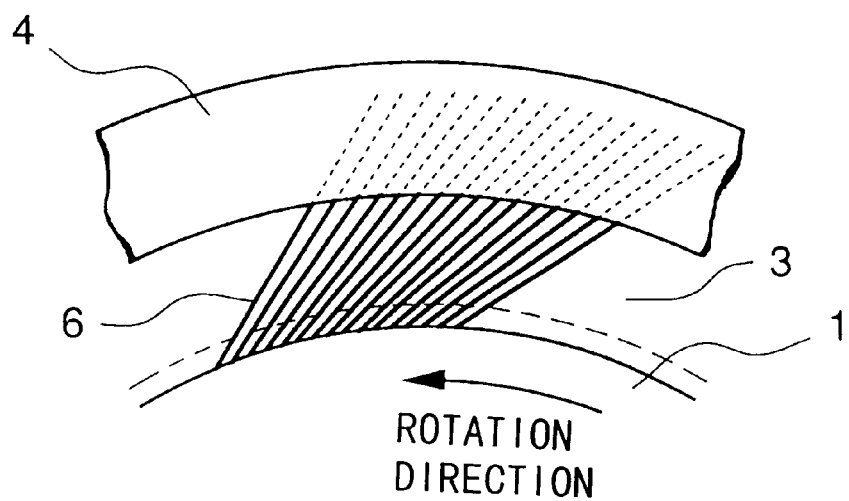

Each shaft seal is attached as shown in FIG. 36B (an enlarged view of the area surrounded by dotted circle Q in FIG. 36A). As shown in the figure, leaves 18 are put between the low-pressure side end plate 13 and the high-pressure side end plate 14, and are attached to casing 12.

Here, the gap between the rotation shaft 11 and each shaft seal is 10 to 20 μm, while in the conventional labyrinth seal, the corresponding gap is 0.5 to 1 mm. Therefore, in the leaf-type shaft seal, the leakage through the above gap is nearly zero, and most of the steam efficiently flows through each gap between the leaves, that is, as laminar flow, towards the low-pressure step side.

The applicable gas turbine type includes a general gas turbine generating power by rotating a turbine shaft by using a combustion gas, and a gas turbine engine used in an airplane. The present invention can also be applied to a fluid machine using steam, such as a steam turbine.

The distinctive features of the present invention relating to the arrangement and attaching method of the shaft seal can also be applied to the conventional brush seal using wires which are circularly arranged and attached to a circular body.

What is claimed is:

1. A shaft seal having:
   a seal ring that is formed from multiple flexible leaves connected to an annular carrier; and
   an end plate arranged at either side of the seal ring, wherein:
   the end plate has a length in the radial direction extending away from the annular carrier such that a portion of each of the leaves nearer to the center of the ring protrudes from the end plate, and
   at least in the protruding portion, a gap is provided between each of the leaves.

2. A shaft seal as claimed in claim 1, wherein one side of the multi-layered leaves is fixed to a fixing member having a cylindrical shape.

3. A shaft seal as claimed in claim 1, which is arranged around a predetermined shaft.

4. A shaft seal as claimed in claim 3, wherein the shaft is a rotation shaft.

5. A shaft seal as claimed in claim 3 or 4, wherein the axial direction of the shaft and the direction of the width of each seal are substantially in the same direction.

6. A shaft seal as claimed in claim 3 or 4, wherein each leaf is inclined with respect to the radial direction of the shaft.

7. A shaft seal as claimed in claim 6, wherein:
the shaft is a rotation shaft; and
each leaf is inclined with respect to the radial direction of the shaft in a manner such that each leaf leans towards the opposite direction of the rotation direction of the rotation shaft.

8. A shaft seal as claimed in claim 7, wherein each leaf has a flat plate shape, and is inclined with respect to the peripheral surface of the rotation shaft by 30 to 45 degrees.

9. A shaft seal as claimed in claim 4, wherein:
buoyancy providing means is provided at the top end at the rotation shaft side of each leaf; and
the buoyancy providing means is a slope wherein the distance between the top point of the leaf and the peripheral surface of the rotation shaft gradually decreases along the rotation direction of the shaft.

10. A processing method for forming the slope in a shaft seal as claimed in claim 9 comprising the steps of:
fixing the outer-peripheral base ends of the leaves in a manner such that each leaf is inclined with respect to the radial direction of the shaft and that each leaf leans towards the opposite direction of the rotation direction of the rotation shaft;
pushing the inner-peripheral free ends of each leaf in a manner such that the acute angle between the leaf and the peripheral surface of the rotation shaft is decreased;
processing the top end of the leaf under the above pushed state, so as to make the top end substantially in parallel with the rotation shaft; and
releasing the pushed state after the processing process.

11. A shaft seal as claimed in claim 4, wherein:
each leaf is inclined with respect to the radial direction of the rotation shaft; and
a fluid delivery unit for delivering fluid around the peripheral surface of the rotation shaft to each leaf by using the centrifugal force of the shaft is provided in an area of the rotation shaft, where the leaves slide.

12. A shaft seal as claimed in claim 6, wherein when the leaves receive pressure from the high-pressure side, the top ends of the leaves are separated from the shaft.

13. A shaft seal as claimed in claim 6, wherein the leaves are grouped into a plurality of unit segments, each unit segment including a predetermined number of leaves, and space is provided between adjacent unit segments.

14. A shaft seal as claimed in claim 3, wherein buoyancy providing means is provided at the shaft-side top end of each leaf.

15. A shaft seal as claimed in claim 14, wherein the buoyancy providing means is provided by forming a step in the end face of the top end of the leaf and in the axial direction of the shaft.

16. A shaft seal as claimed in claim 14, wherein the buoyancy providing means is provided by forming a step in the end face of the top end of the leaf and in the circumferential direction of the shaft.

17. A shaft seal as claimed in claim 3, wherein the direction of the width of each leaf is not parallel with the axial direction of the shaft.

18. A shaft seal as claimed in claim 1, wherein the gap between adjacent leaves is substantially the same at both the inner-peripheral side and the outer-peripheral side.

19. A shaft seal as claimed in claim 1, wherein each leaf has a circular-arc section shape so that the curvature gradually changes in the radial direction of the ring shape.

20. A shaft seal as claimed in claim 1, wherein the end plates are circumferential end plates which are respectively arranged at both sides of the leaves, and a gap is provided between the leaves and each end plate wherein the width of the gap is as narrow as possible for the leaves to move.

21. A shaft seal as claimed in claim 20, which is arranged around a predetermined shaft, wherein:
each leaf is inclined with respect to the radial direction of the shaft; and
the gap between the shaft and the top end of one of the end plates is the same as the gap between the shaft and the top end of the other end plate.

22. A shaft seal as claimed in claim 20, wherein the gap between one of the end plates and the leaves is the same as the gap between the other end plate and the leaves.

23. A shaft seal as claimed in claim 1, wherein the outer-peripheral base end of the ring-shape leaves are attached to a circular body consisting of a plurality of separate circular-arc portions, and a division face between the separate circular-arc portions engaged with each other has a step in the circumferential direction.

24. A shaft seal as claimed in claim 1, wherein the leaves are grouped into a plurality of unit segments, each unit segment including a predetermined number of leaves, and space is provided between adjacent unit segments.

25. A shaft seal as claimed in claim 1, wherein each leaf has a gap making portion which protrudes from the surface of the leaf.

26. A shaft seal as claimed in claim 25, wherein the gap making portion is a protruding portion produced by deforming a part of the leaf.

27. A shaft seal as claimed in claim 25, wherein the gap making portion is a coated layer formed on a part of the leaf.

28. A shaft seal as claimed in claim 25, wherein the gap making portion is a step produced by etching a part of the leaf.

29. A shaft seal as claimed in claim 1, having a plurality of escape passages in the circumferential direction, wherein the escape passages are provided by making gaps between the relevant leaves have a larger width in comparison with the other gaps between the leaves.

30. A shaft seal as claimed in claim 1, wherein the leaves are grouped into a plurality of unit segments, each unit segment including a predetermined number of leaves, and the leaves of each unit segment are attached to a main leaf whose thickness is larger than that of each leaf.

31. A shaft seal apparatus in which a plurality of ring-shaped shaft seals as claimed in claim 1 are arranged around a predetermined shaft, via a spacing between each other along the axial direction of the shaft.

32. A shaft seal apparatus as claimed in claim 31, wherein among the shaft seals, the width in the axial direction of the shaft seal closest to the high-pressure side is largest, while the width in the axial direction of the shaft seal closest to the low-pressure side is smallest.

33. A shaft seal apparatus as claimed in claim 31, wherein width L in the axial direction of each shaft seal is defined by the following formula:

$$L = k\,(P_1^2 - P_2^2)/G$$

where $P_1$ indicates the pressure at the high-pressure side, $P_2$ indicates the pressure at the low-pressure side, G indicates the weight flow of leakage of fluid, and k is a specific coefficient.

34. A turbine in which a shaft seal as claimed in claim 1 is provided around a shaft.

35. A turbine as claimed in claim 34, which is a gas turbine in which a high-temperature and high-pressure gas is introduced into a casing, and the high-temperature and high-pressure gas is blasted against moving blades fixed to a rotation shaft which is rotatably supported in the casing, so that the thermal energy of the gas is converted into the mechanical rotational energy and power is generated, and the shaft seal is arranged so as to seal the outer-peripheral side of the rotation shaft of the gas turbine.

36. A turbine as claimed in claim 35, wherein:

the gas turbine comprises moving blades and stationary blades alternately arranged from a high-pressure stage to a low-pressure stage along the turbine shaft; and the shaft seal is arranged between the rotation shaft and one or more stationary blades.

37. A turbine as claimed in claim 36, wherein the shaft seal is fixed to the top end of the stationary blade.

38. A turbine as claimed in claim 36, wherein the shaft seal is provided at least between the stationary blade of the most high-pressure side and the rotation shaft.

39. A turbine as claimed in claim 34, comprising a casing, a compressor, a rotation shaft, moving blades attached to the rotation shaft, and stationary blades attached to the casing in a manner such that the stationary blades face the moving blades, wherein:

the shaft seals are provided between a plurality of stationary blades and the rotation shaft wherein the leaves of each shaft seal contact the rotation shaft;

under the rated operating conditions, the top ends of the leaves slightly separate from the surface of the rotation shaft due to the dynamic pressure generated by the rotation of the rotation shaft; and when the turbine is not operated, the top ends of the leaves contact the rotation shaft again due to the elastic restoring force of the leaves.

40. A remodeling method comprising a step of exchanging a shaft seal arranged around a shaft of a turbine for a shaft seal as claimed in claim 1.

* * * * *

UNITED STATES PATENT AND TRADEMARK OFFICE
CERTIFICATE OF CORRECTION

PATENT NO. : 6,343,792 B1
DATED : February 5, 2002
INVENTOR(S) : Shinohara et al.

It is certified that error appears in the above-identified patent and that said Letters Patent is hereby corrected as shown below:

<u>Title page,</u>
Items [22], [86] and [87], should read:

-- [22]  PCT Filed:       Jul. 13, 1999

[86]  PCT No.:         PCT/JP99/03760

§371 Date:       Mar. 13, 2000

§102(e) Date:    Mar. 13, 2000

[87]  PCT Pub. No.:    WO00/03164

PCT Pub. Date:   Jan. 20, 2000 --.

Signed and Sealed this

Twenty-seventh Day of December, 2005

JON W. DUDAS
*Director of the United States Patent and Trademark Office*